United States Patent [19]

Elkind et al.

[11] Patent Number: 4,972,362

[45] Date of Patent: Nov. 20, 1990

[54] METHOD AND APPARATUS FOR IMPLEMENTING BINARY MULTIPLICATION USING BOOTH TYPE MULTIPLICATION

[75] Inventors: Bob Elkind, Gaston; Jay D. Lessert; James R. Peterson, both of Portland; Gregory F. Taylor, Beaverton, all of Oreg.

[73] Assignee: Bipolar Integrated Technology, Inc., Beaverton, Oreg.

[21] Appl. No.: 209,156

[22] Filed: Jun. 17, 1988

[51] Int. Cl.$^5$ ............................................. G06F 7/52
[52] U.S. Cl. ................................................... 364/760
[58] Field of Search .................... 364/754, 757, 760

[56] References Cited

U.S. PATENT DOCUMENTS

| | | | |
|---|---|---|---|
| 4,546,446 | 10/1986 | Machida | 364/760 |
| 4,571,701 | 2/1986 | Lerouge | 364/757 |
| 4,589,086 | 5/1986 | Beifuss et al. | 364/760 |
| 4,679,165 | 7/1987 | Ramer | 364/760 |
| 4,718,031 | 1/1988 | Nukiyama | 364/754 |
| 4,807,175 | 2/1989 | Tokumaru et al. | 364/760 |
| 4,831,577 | 5/1989 | Wei et al. | 364/760 |

OTHER PUBLICATIONS

Santoro et al., "WAM 2.6: A Pipelined 64bx64b Iterative Array Multiplier", IEEE International Solid-State Circuits Conf., 2/17/88, pp. 36-37 and 290.
"B3110/B3120/B2110/B2120 Floating Point Chip Set'-'—Preliminary Data Sheet, Bipolar Integrated Technology, Inc., Sep. 1987.
Peterson, J. and Leibowitz, R. N., "Processor Chip Set Shrinks Latency, Boosts Throughput," Electronic Design, Feb. 5, 1987.
"Designing a Micro-Sequenced CPU with the B3110/B3120", Application Note AN-1, Bipolar Integrated Technology, Inc., Aug. 1987.
Baugh, C. R. and Wooley, B. A., "A Two's Complement Parallel Array Multiplication Algorithm," IEEE Transactions on Computers, vol. C-22, No. 12, Dec. 1973.
Elkind, B.; Lessert, J.; Peterson, J., and Taylor, G., "A Sub 10 nS Bipolar 64 Bit Integer/Floating Point Processor Implemented on Two Circuits," paper presented at Bipolar Circuits in Technology Meeting, Sep. 1987.
"High Performance VLSI Solutions for Digital Signal Processing and High-End Data Processing," Product Summary, Bipolar Integrated Technology, Inc., Aug. 1986.
Leibowitz, B. and Taylor, G., "EC1 Gains Ground in Battle Against CMOS," Computer Design, Apr. 1, 1987.
"VLSI Solutions for High Performance Systems," Product Handbook, Bipolar Integrated Technology, Inc., Jun. 1987.
"Surprise! EC1 Runs on Only Microwatts," Electronics, pp. 35-38, Apr. 7, 1986.
G. Wilson, "Creating Low-Power Bipolar ECL at VLSI Densities," VLSI Systems Design, pp. 84-86, May, 1986.
Downing, P., et al., "Denser Process Gets the Most Out of Bipolar VLSI," Electronics, pp. 131-133, Jun. 28, 1984.
"A Bipolar Process That's Repelling CMOS," Electronics, pp. 45-47, Dec. 23, 1985.
Kaji, Y., et al., "A 45 ns. 16×18 CMOS Multiplier," ISSCC Digest of Technical Papers, pp. 84-85, Feb. 1984.
"B3110/B3120 B2110/B2120 Floating Point Chip Set'-'—Preliminary Product Summary, Bipolar Integrated Technology, Inc., Dec. 1986.

Primary Examiner—Dale M. Shaw
Attorney, Agent, or Firm—Marger, Johnson, McCollom & Stolowitz, Inc.

[57] ABSTRACT

In a high-speed binary multiplier circuit, the multiplicand is segmented into a series of 8-bit slices and the multiplier is modified-Booth recoded into 3-bit groups. The corresponding partial product terms are reduced in a regular array of small carry-save adder cells. Iterative use of the CSA array provides the Wallace tree function in one-seventh the chip area or number of adders of a conventional implementation. The multiplier is pipelined internally, driven by a fast, two-phase internal clock that is transparent to the user. The internal clock stops and restarts upon loading new operand and instruction data to synchronize the internal clock to the system clock. Other aspects of the invention include high-speed absolute value subtract circuitry for exponent calculations and normalizing floating point results.

28 Claims, 18 Drawing Sheets

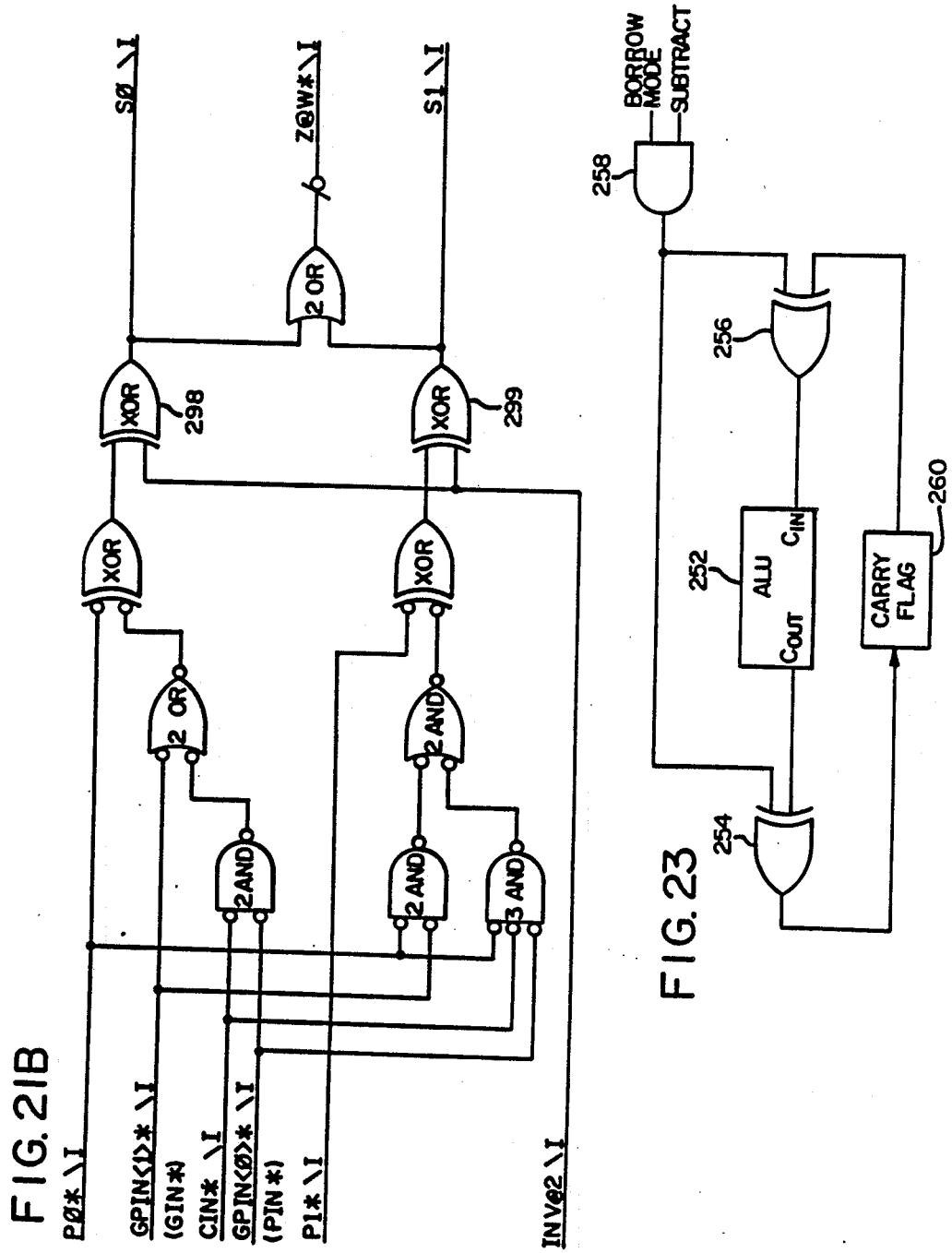

METHOD AND APPARATUS FOR IMPLEMENTING BINARY MULTIPLICATION USING BOOTH TYPE MULTIPLICATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

Field of the Invention

The present invention relates to the field of digital computer processors and, more particularly, to fast, very large scale integrated circuit (VLSI) floating point processors for use in computer systems for computation-intensive tasks.

In the field of technical computing, such as digital signal processing, graphics processing, CAD and simulation applications, it is necessary to perform large numbers of arithmetic operations very quickly. Additionally, it is desirable for many applications to perform floating point operations in order to accommodate numbers which vary widely in magnitude.

Most general purpose programmable digital computers may be programmed to perform various arithmetic operations including floating point operations. That software approach is too slow, however, for modern applications such as those mentioned above. One way to hasten arithmetic operations is to use special purpose circuits. These circuits, commonly called coprocessors, are dedicated to performing mathematical operations in conjunction with a general purpose CPU such as that found in a modern microprocessor chip. Dedicated circuits of that type perform arithmetic operations significantly faster than doing so with software. The size and speed limitations of coprocessors, nonetheless, are inadequate for use in technical computing systems of the classes currently known as super-minicomputers or mini-supercomputers. Present day machines of that type operate at speeds (bandwidths) on the order of 20-50 MHz. Yet, available floating point hardware meeting size, cost and power constraints of such systems operate at half that rate, thereby wasting other system resources.

System designers face the restrictions of traditional hardware operations: floating point coprocessors are easy to design with, but offer limited performance. CMOS integrated chip sets can boost speed but demand substantial design efforts. Custom or semi-custom components can provide excellent speed but also take considerable design resources and are very expensive to design and implement.

Many designers rely on a CMOS floating point chip set in a pipelined system to maximize performance. But latency can extend the computing time of a CMOS integrated circuit, for example, 100 nanoseconds, to three or four times that period for double-precision multiplication. In fact, for most technical applications it is latency, not the pipeline rate, that determines computation speed. Moreover, pipelining complicates both hardware and software design.

Bipolar technology was used to implement first-generation technical computing and digital signal processing systems because of its speed and availability. Since then, significant enhancements in CMOS technology have resulted in CMOS being favored over bipolar technology for many applications. Using VLSI technology, pipelined CMOS systems have achieved system-level throughput rates of 20 MFlops while maintaining power dissipation levels below 2 watts per package.

The most advanced integrated circuits known to be available for operations including floating point multiply are the Analog Devices ADSP3210 and the Texas Instruments 8847. The Analog Devices chip employs CMOS technology and requires four passes through the multiplier hardware to perform a double precision floating point multiply in about 400 nanoseconds. The Texas Instruments chip employs a two-stage pipelined architecture having approximately a 50 nanosecond delay per stage in performing double precision multiply. A relatively fast bipolar integrated circuit presently available is the AMD 29325. That device performs a 32-bit single precision operation in about 100 nanoseconds. It is not capable of double precision operations.

Many designers perceive bipolar emitter-coupled logic (ECL) technology as having a less attractive price-performance combination compared to CMOS. To be suited for high-speed VLSI, the fabrication technology selected must be based on small, fast transistors. Traditional bipolar transistors were fast, but their relatively large size resulted in large device and interconnect capacitances. This, of course, limited their speed. Integrated circuits based on ECL technology also dissipated a great deal of power and were not densely packaged. Where speed was critical, designers would use CMOS technology to extract parallelism from algorithms and implement systems rather than designing with SSI and MSI components required by bipolar technology.

We have reassessed the architectural configuration of floating point processors, multipliers and ALUs commonly used in conventional practice, particularly in light of the development of more advanced integrated circuit processes. Several such processes have recently been described in the literature, including: Downing, P., et al., "Denser Process Gets the Most Out of Bipolar VLSI," *Electronics*, pp. 131-133, June 28, 1984; "A Bipolar Process That's Repelling CMOS," *Electronics*, p. 45-47, Dec. 23, 1985; "Surprise! ECL Runs on Only Microwatts," *Electronics*, pp. 35-38, Apr. 7, 1986; and Wilson, G., "Creating Low-Power Bipolar ECL at VLSI Densities," *VLSI Systems Design*, pp. 84-86, May 1986. Other VLSI bipolar processes include the National Semiconductor/Fairchild ASPECT process and the AMCC/Plessy HE1 process.

These more advanced processes provide increased speed and device density and lower power dissipation levels, which in turn offer several significant benefits to the system designer and user. First, smaller transistors enable higher density and thereby allow implementation of more complex functions on a chip. Second, with greater density, the system designer can use fewer parts, and power requirements are reduced. As a result, the speed and throughput of the overall system can be increased because the parts interconnection delay can be readily reduced.

SUMMARY OF THE INVENTION

New floating point circuitry according to the present invention represents substantial advances over the techniques and circuitry described above. In the preferred embodiment, a floating point chip set consists of a floating multiplier chip (FMPY) and a floating point arithmetic and logic unit (FALU), each incorporating flow-through architecture, implemented in VLSI bipolar emitter-coupled logic. The chips have latency times under 50 ns, faster than the pipeline speeds for CMOS chips doing comparable operations. The user can configure the FALU with either edge-triggered registers or transparent latches on the output and output ports, and can do so in the FMPY on the input ports. The latches help minimize problems caused by system-clock skew because an operation does not have to wait for a clock edge. An operation can start as soon as the latches are open and the chip receives a valid operation code and data.

Moreover, the architecture described below includes multiple clocks inputs, adding flexibility and simplifying system timing. For example, connecting the input and output clocks (CK1 and CK2) together causes the input and output latches to act as a master-slave flip-flop pair.

Separate clock enables on each input and output port also decouple the cycle and operation times. This feature, which simplifies freezing operation of the chips for inserting wait states, is particularly useful since seven different operation times are possible. The separate input and output clocks can help the user minimize cycle time The user can elect to bypass the input and output latches or both and operate the chips in a flow-through mode.

In a preferred embodiment, floating point instructions include multiply, divide, square root, add, subtract, absolute value, negate, min/max and compare. Data formats include 32-bit and 64-bit, integer and floating point. The divide and square root functions are primitives that give full-precision results as defined by IEEE standard 754; no external lookup table or seed value is needed.

The floating point multiply chip FMPY includes a novel Functional Unit for carrying out floating point operations. Within the Functional Unit, the mantissa multiply circuitry includes a novel array of carry-save adder cells for reducing the partial product terms with minimum delay. According to one feature of the invention, the multiply circuitry includes a fast internal clock, nominally 500 MHz in an example of the invention, that is decoupled from the system clock. According to another feature of the invention, the carry-save adder arrays are organized in a regular, symmetric arrangement for ease of chip design, minimizing space requirements.

According to yet another feature of the invention, the partial products are iteratively reduced in the functional equivalent of a pair of registers. Thus, the function of a Wallace tree is implemented with only one-seventh the area or number of adders of a conventional Wallace tree configuration. Only two stages of registers are required to reduce 14 partial product terms.

In another aspect of the invention, the multiplier block includes means for segmenting the multiplicand into a plurality of slices, e.g., 8 bits wide in the preferred embodiment. Accordingly, the corresponding partial product terms, also 8 bits wide, can be reduced in 8-bit carry-save adder cells, thereby reducing gate delay times. A novel arrangement of the carry-save adder cells in the multiply block effectively accomplishes the shifting required by Booth's algorithm without special hardware dedicated to that task. This novel arrangement minimizes idle time of the hardware.

According to another feature of the invention, the two carry-save adder blocks are clocked on alternate phases of the fast internal clock, by incorporating flow-through architecture in lieu of conventional pipelining and register techniques.

An internal, high frequency clock drives the computational circuitry. To reduce the probability of errors in clocking in data at very high speed, the internal clock is stopped and restarted each time new operands are input.

A substantial advantage of the iterative multiplier of this invention is that it requires much less circuitry than prior combinatorial multipliers and can thus be integrated into a single chip. At the same time, throughput is not sacrificed, indeed can be enhanced, by running the iterative multiply circuitry from the internal clock much faster than the system clock and by use of flow-through architecture.

Other features of the invention include integer subtract logic adapted to operate in either carry mode or borrow mode, and novel absolute value subtract circuitry to accelerate floating point arithmetic with negligible added hardware.

The foregoing and other objects, features and advantages following detailed description of a preferred embodiment which proceeds with reference to the drawings.

BRIEF DESCRIPTION OF THE DRAWINGS

FIG. 21B is a logic simulation diagram of an additional portion of the two-bit adder slice showing the integrated implementation of the exclusive-OR circuitry of FIG. 19.

FIG. 23 is a logic diagram of the borrow mode logic implemented in the FALU.

DETAILED DESCRIPTION OF A PREFERRED EMBODIMENT

General Arrangement and Data Path Operations

Figure 1:
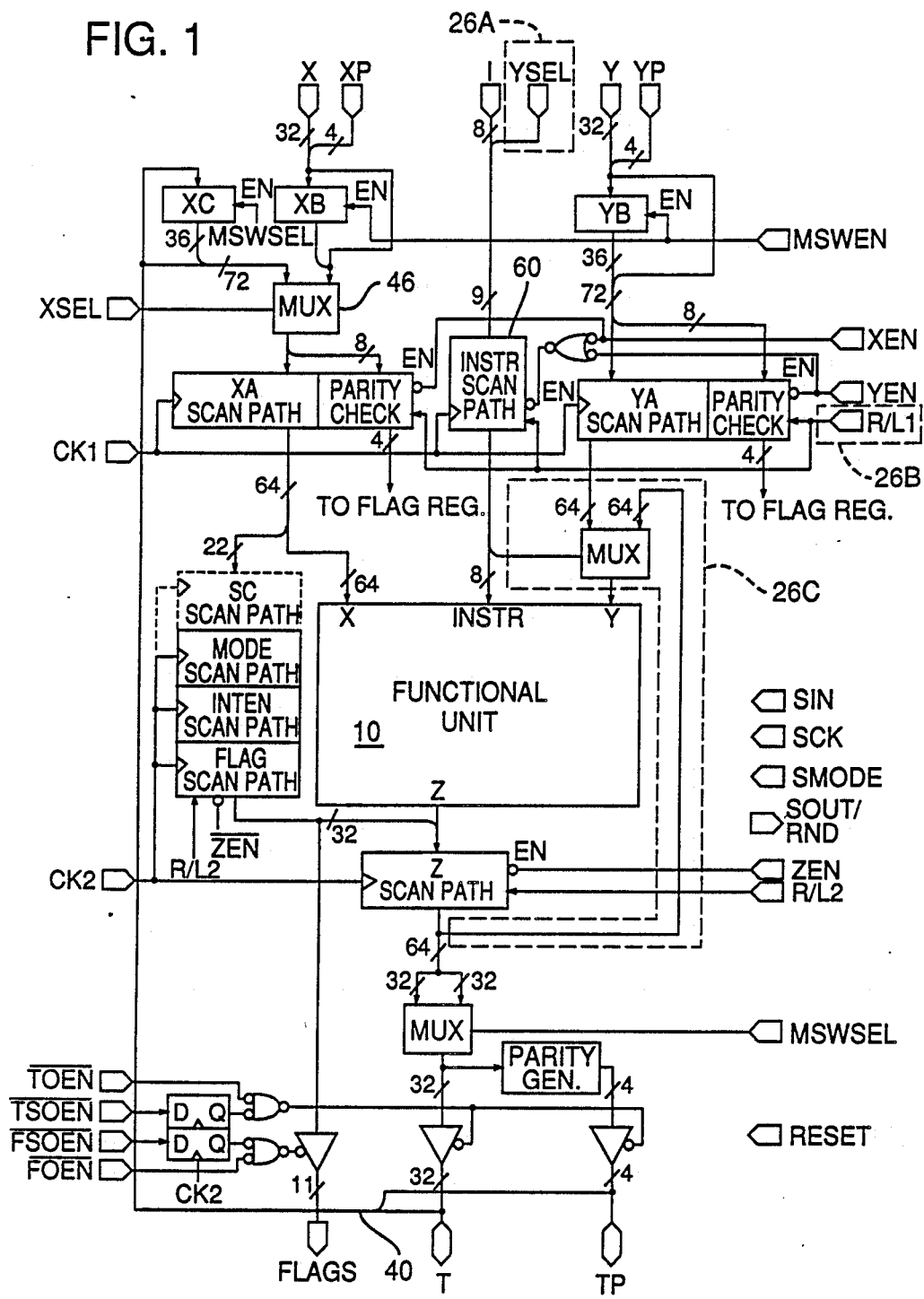
FIG. 1 is a block diagram showing the general architecture of an integrated floating point circuit in which the present invention is implemented in two embodiments; in the first embodiment the Functional Unit being a multiplier (FMPY) and in the second an arithmetic and logic unit (FALU), the elements shown in dashed lines indicating circuitry unique to the FALU embodiment.

Referring to FIG. 1, a block diagram is shown depicting the general architecture of an integrated floating point circuit in which the present invention is implemented in two embodiments. In the first embodiment, the Functional Unit 10 performs multiply, divide and square root, and the integrated circuit is referred to as a floating point multiplier, hereinafter designated "FMPY." In a second embodiment, the Functional Unit is an arithmetic and logic unit, and the integrated circuit is referred to as a floating point ALU, hereinafter "FALU". In the FALU architecture, the result Z may be provided back to the Y input of the FALU Functional Unit via multiplexer logic 26C, controlled by input YSEL 26A. This hardware is not included in the FMPY implementation. Also, the SC logic appears only in the FALU implementation.

The FMPY and FALU each provide two 32-bit (plus 4 parity bits) input data ports X and Y, and one 32 (+4) bit bidirectional data port (T). Data present at the T port is internally fed back via path 40 to the X input register, XA, via multiplexer 46 and may be selected by asserting XSEL. In addition, the 64 bit Z result can be fed back to the Y input multiplexer circuitry 26C (FALU only) and selected with YSEL.

Two modes are available for clocking the X and Y operands. When R/L1=1 (input 26B), XA and YA are configured as edge-triggered registers. Data is loaded on the rising edge of CK1. In the FALU, input R/L1=0 configures XA and YA as latches which are transparent when CK1=0. $\overline{XEN}$ enables XA to be loaded, and $\overline{YEN}$ enables YA to be loaded. The operation of the instruction register 60 is identical to that of XA and YA except that either $\overline{XEN}$ or $\overline{YEN}$ enable instructions to be loaded.

Output data may also pass through a register or a transparent latch. When R/L2=1, circuit Z is configured as an edge-triggered register. Data is loaded on the rising edge of CK2. Input R/L2=0 configures circuit Z as a latch which is transparent when CK2=1. $\overline{ZEN}$ enables circuit Z. The enables $\overline{XEN}$, $\overline{YEN}$ and $\overline{ZEN}$ are latched internally.

Double Precision Operands

Referring again to FIG. 1, transparent input latches XB and YB are used to store the most significant word of a double precision operand from ports X and Y. The latches are transparent when the MSWEN clock is high.

Double precision operand transfers to the FMPY/FALU consist of two steps. First the most significant word is latched in XB/YB with MSWEN. The least significant word is then transferred through ports X and Y, concatenated with the contents of latches XB and YB, respectively and then clocked into circuits XA and YA with CK1.

Similarly, double precision operand transfers from the Z register/latch or T port will use latch XC to latch the most significant word. XC is transparent when MSWSEL is high. When MSWSEL is low, the least significant 32 bits of the result is output to the T port and fed back to the X input multiplexer. If XSEL is high, CK1 will clock the feedback operand into the XA register/latch.

The full 64-bit result is clocked into the Z register/latch with CK2. The output multiplexer then selects which half will appear at the T port. When MSWSEL is high, the most significant 32 bits of the result is output to the T port and is available at X input multiplexer 46.

Single Precision Operands

Single precision operands are clocked directly into registers/latches XA and YA; latches XB/XC and YB are bypassed. The single precision result is always output to port T, regardless of the state of MSWSEL. Definitions of input and output signals that are shown in FIG. 1 but not discussed here are published in "B3110/B3120; B2110/B2120 Floating Point Chip Set (Preliminary)" (Bipolar Integrated Technology, Inc., 1987).

Figure 2:
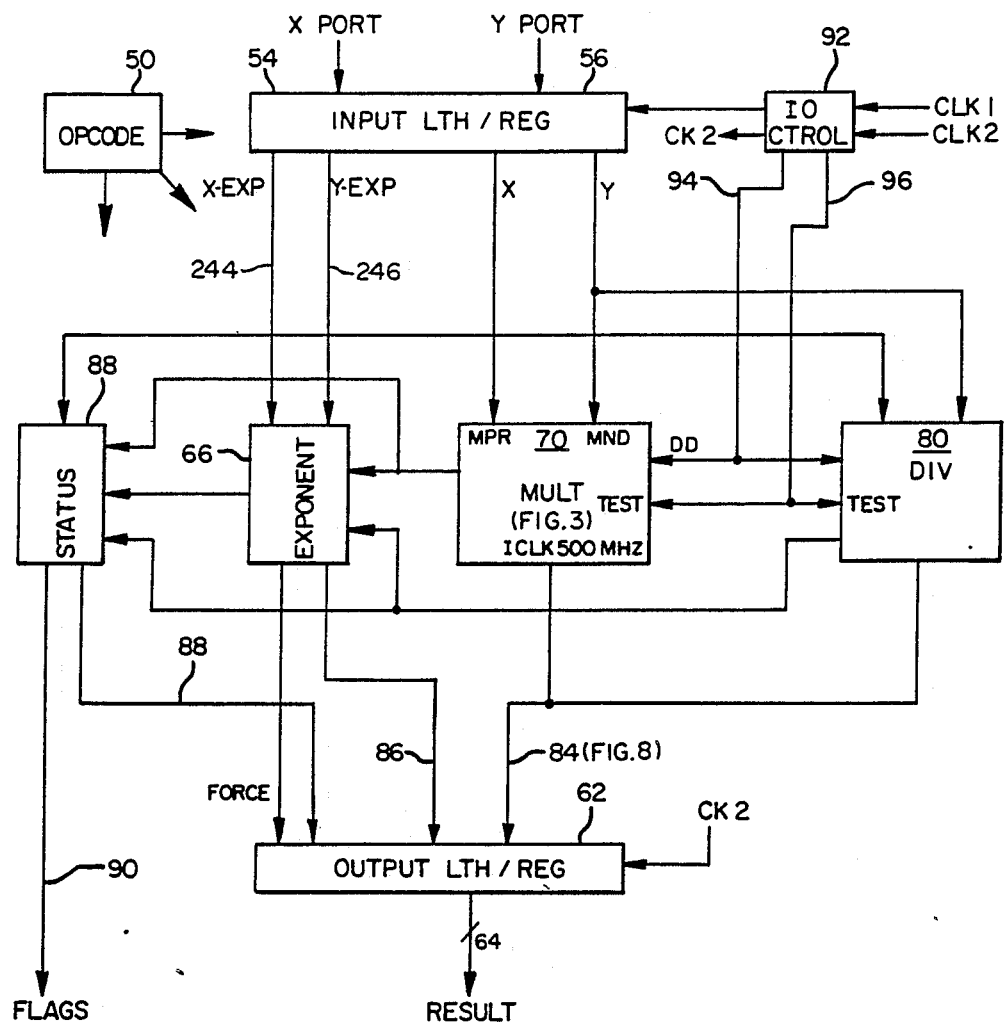
FIG. 2 is a block diagram showing the microarchitecture of the Functional Unit as a multiply block in the FMPY device of FIG. 1.

Referring now to FIG. 2, a block diagram depicting the microarchitecture of the Functional Unit in the FMPY implementation of the circuit of FIG. 1 is shown. The FMPY performs four types of operations: multiply, divide, square root and pass operand. Instructions are decoded in the opcode functional block 50. That block provides various control signals to other parts of the circuitry as appropriate. Data are input to the input latch/register 54 (X operand) and 56 (Y operand) as described above. Latch/register 54-56 consists of latches XA and YA shown in FIG. 1.

The Functional Unit hardware is divided into the following Functional blocks. The exponent in a floating point operation is determined in the exponent block 66. Multiplication of the fractional part (mantissa) of floating point operands is carried out in multiply block 70. Division and square root are carried out in division block 80. Results of arithmetic operations from either the multiply block 70 or the division block 80 flow over data path 84 to the output latch/register 62. The exponent portion of a floating point operation is provided over data path 86 to the output latch/register. Additionally, status information may be provided to the output latch/register over path 88.

Referring now to the upper right portion of FIG. 2, the CLK1 and CLK2 signals are provided to IO control block 92. IO control block 92 provides a new data detect signal (DD) over path 94 to the multiply block 70 and the division block 80 when new data are received. The IO control logic also provides a test mode signal over path 96 to the multiply and divide blocks. In the test mode, the multiply and divide blocks operate internally at a faster than normal rate, as further described below.

Serial scan path capability is provided, as shown in FIG. 1, through all registers for purposes of testing and debugging. The inputs labeled SMODE, SCK and SIN are scan path inputs. The scan path circuitry provides a serial output at SOUT/RND.

Overview of The Multiply Block

Figure 3:
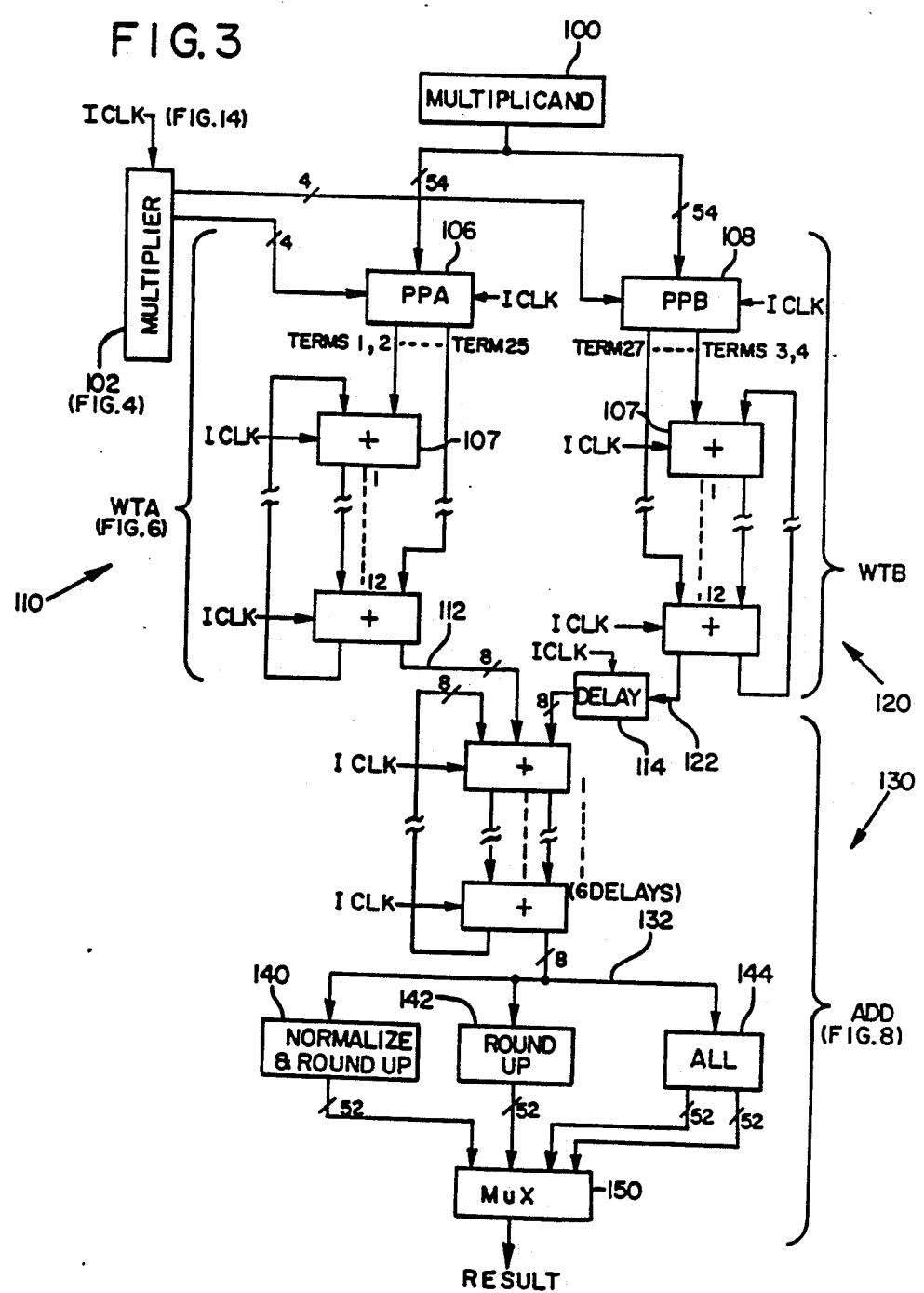
FIG. 3 is a register transfer level (RTL) diagram of selected portions of the multiply block of FIG. 2.

Referring now to FIG. 3, selected portions of the multiply block 70 of FIG. 2 are shown at the register transfer level. The multiplicand block 100 and multiplier block 102 receive operand information from the Y input register 54 and the X input register 56 (FIG. 2), respectively. The operand data is input to each of two substantially identical partial product (PP) blocks 106 (PPA) and 108 (PPB). The PP logic generates partial product terms.

The partial product terms are subsequently reduced in pseudo-Wallace tree WT logic, WTA 110 and WTB 120, so designated because it implements the function of a Wallace tree, though it is not so constructed. Instead of operating on a full-width multiplicand to produce and sum full-width partial products in a single, simultaneous parallel operation, the partial products are computed as partial product terms based on segments of the operands iteratively processed through a series of multiply and add stages 107. Then, to double the processing speed, two parallel series of stages 107 are provided that use alternative segments of the multiplier to produce partial results that are summed back together to give a final product. Partial product terms generated in PPA (the partial product logic block 106) are input to WTA 110. Partial product terms generated by PPB are reduced in WTB 120. Each of the WTs produces partial results.

Partial results generated in WTA 110 and WTB 120 are provided on data paths 112 and 122 to ADD circuitry 130. The ADD logic 130 accumulates the complete result. The result is provided on data path 132 to the inputs of each of three result registers: register 140 (normalize and round up), register 142 (round up) and register 144 (A11). Finally, the contents of one of the result registers is selected in multiplexer 150 and the selected result is output to the output register/latch shown in FIG. 2. Additional detail of the multiplier logic block 102 is explained next, followed by a discussion of the timing of operation of the multiplier circuitry.

Multiplier Recoding

Figure 4:
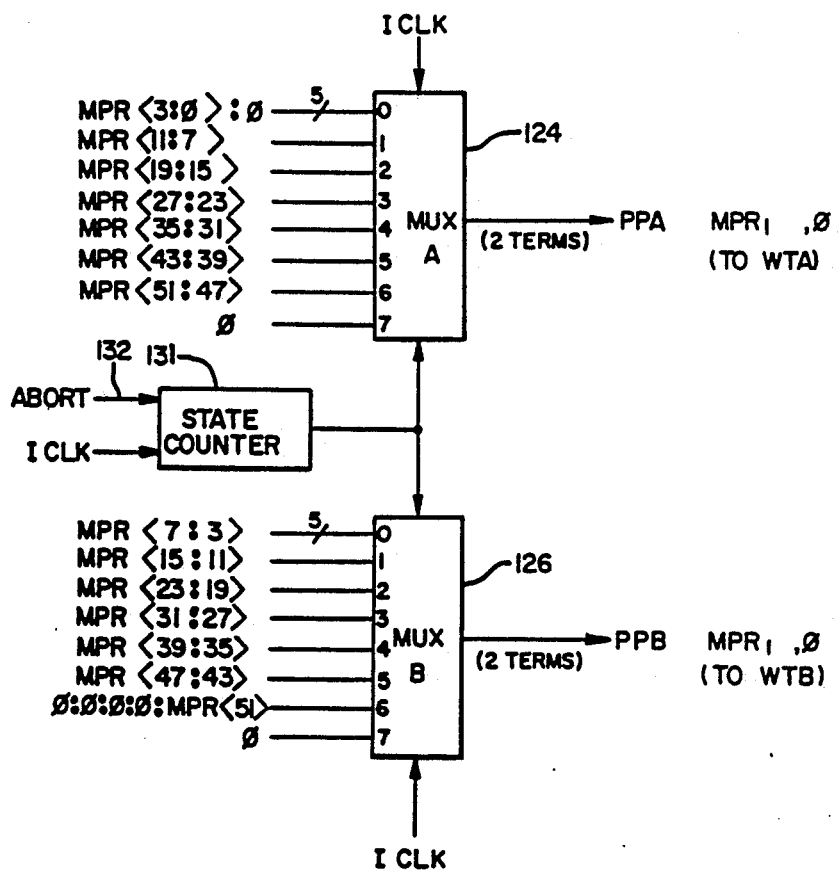
FIG. 4 shows additional detail of the multiplier recoding logic of the partial product blocks of FIG. 3.

Referring now to FIG. 4, additional detail of the multiplier recoding logic (block 102 in FIG. 3) is shown. The recoding logic includes first multiplexer/shift register logic 124 (MUX A) and second multiplexer/shift register logic 126 (MUX B). The select lines of the recode MUXs are driven by a state counter 131. Both the MUXs and the counter are clocked by an internal clock signal ICLK. The state counter is reset to start at 0 by ABORT signal on path 132. The state counter cycles through selections 0-7 and locks in state 7, until the abort signal is asserted to reset it.

Multiplier (MPR) bits are input to MUXs 124 and 126 in groups as shown in FIG. 4. The notation "MPR<a:b>" in FIG. 4 denotes multiplier bits a through b, inclusive, in parallel. Each input receives five multiplier bits. Input 0 to MUX A receives multiplier bits 3-0 plus a forced 0, for a total of 5 bits. Each 5-bit group is recoded to form a pair of 3-bit recode groups, PPA MPR0 and PPA MPR1, having 1-bit overlap. Recoding of the multiplier bits is illustrated in FIG. 5.

Figure 5:
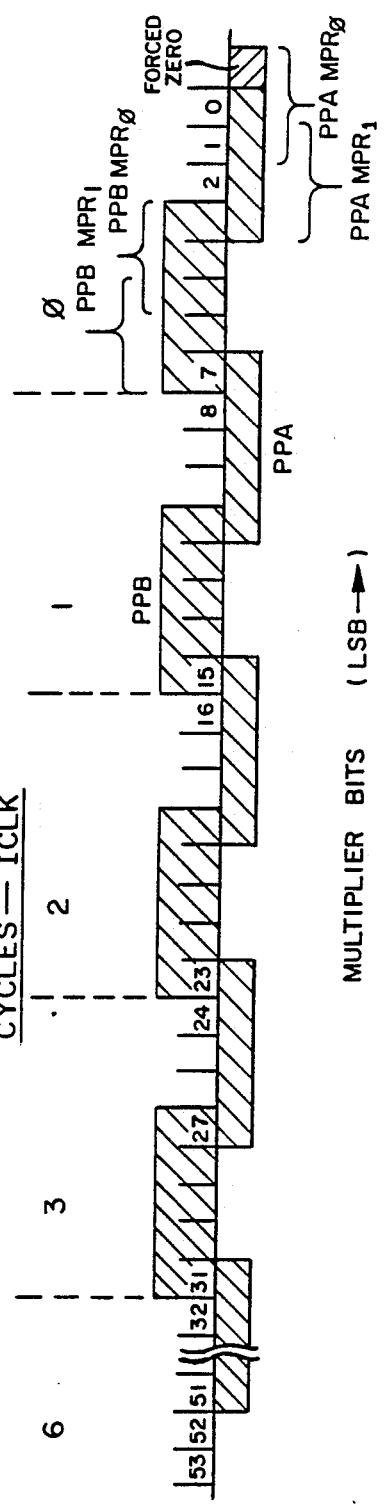
FIG. 5 is a diagram of a 54-bit multiplier (i.e., first operand) showing the positions of the recoded groups of bits generated by the recoding logic of FIG. 4 with respect to the internal clock.

The recoding scheme carried out by the logic shown in FIG. 4 and illustrated in FIG. 5 is a second order extension of Booth's algorithm. This algorithm is explained in greater detail in U.S. Pat. No. 4,718,031. The recode bits indicate to the PPs the appropriate operation on the multiplicand required to create the partial product terms, as further explained in the next section.

On each cycle of the internal clock signal ICLK, the state counter 131 is incremented by one, and the multiplexers 124 and 126 output the next pair of recoded groups, in order of increasing significance. On the first clock cycle, the first pair of recode groups, corresponding to multiplier bits 3-0 (plus a hard 0), are output by the first multiplexer 124. At the same time, the pair of recode groups corresponding to multiplier bits 7-3 are output by multiplexer 126. Thus, two pairs or four recode groups of bits, corresponding to 8 bits of multiplier are generated by the logic shown in FIG. 4 during one clock period. This is indicated in FIG. 5 as ICLK cycle 0.

Generating and Reducing Partial Product Terms

The partial product logic 106 (PPA) and 108 (PPB) (FIG. 3) include circuitry for multiplying the multiplicand in accordance with the recode groups of bits. The recode bits are interpreted as indicated in the following Table:

TABLE 1

| \multicolumn{5}{c}{Second order Booth's algorithm recoding} |
|---|---|---|---|---|
| $a_{2i}$ | $a_{2i-1}$ | $a_{2i-2}$ | $b_i$ | operation |
| 0 | 0 | 0 | 0 | no operation |
| 0 | 0 | 1 | +1 | add the multiplicand |
| 0 | 1 | 0 | +1 | add the multiplicand |
| 0 | 1 | 1 | +2 | add twice the multiplicand |
| 1 | 0 | 0 | −2 | subtract twice the multiplicand |
| 1 | 0 | 1 | −1 | subtract the multiplicand |
| 1 | 1 | 0 | −1 | subtract the multiplicand |
| 1 | 1 | 1 | 0 | no operation |

In conventional multiplier architecture, the indicated operation on the multiplicand would be carried out in hardware having the same width as the multiplicand, here 54 bits. That arrangement would yield a full-width partial product, which is shifted, and then added together with other full-width partial product terms in a Wallace tree arrangement. Instead, the present invention includes a novel architecture better suited to dense integrated circuit implementation and very fast operation. Smaller, 2 by 8 bit multipliers generate the partial product terms. The terms are shifted and added in a regular array of carry/save adder (CSA) cells. Data is pipelined through the CSA array to maximize throughput of the circuitry as more fully explained below.

Figure 6A:
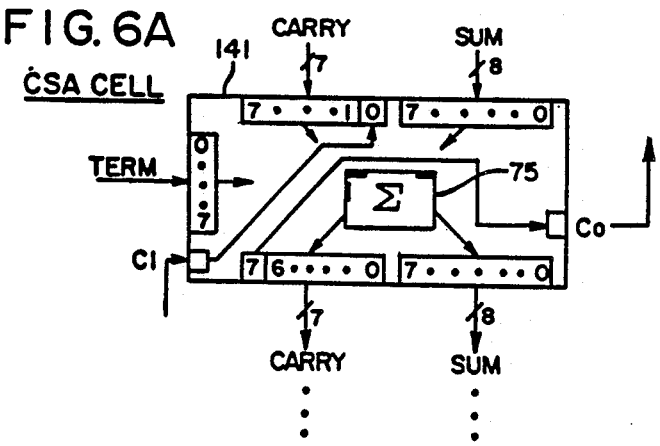
FIG. 6A shows a functional representation of a CSA cell.
Figure 6:
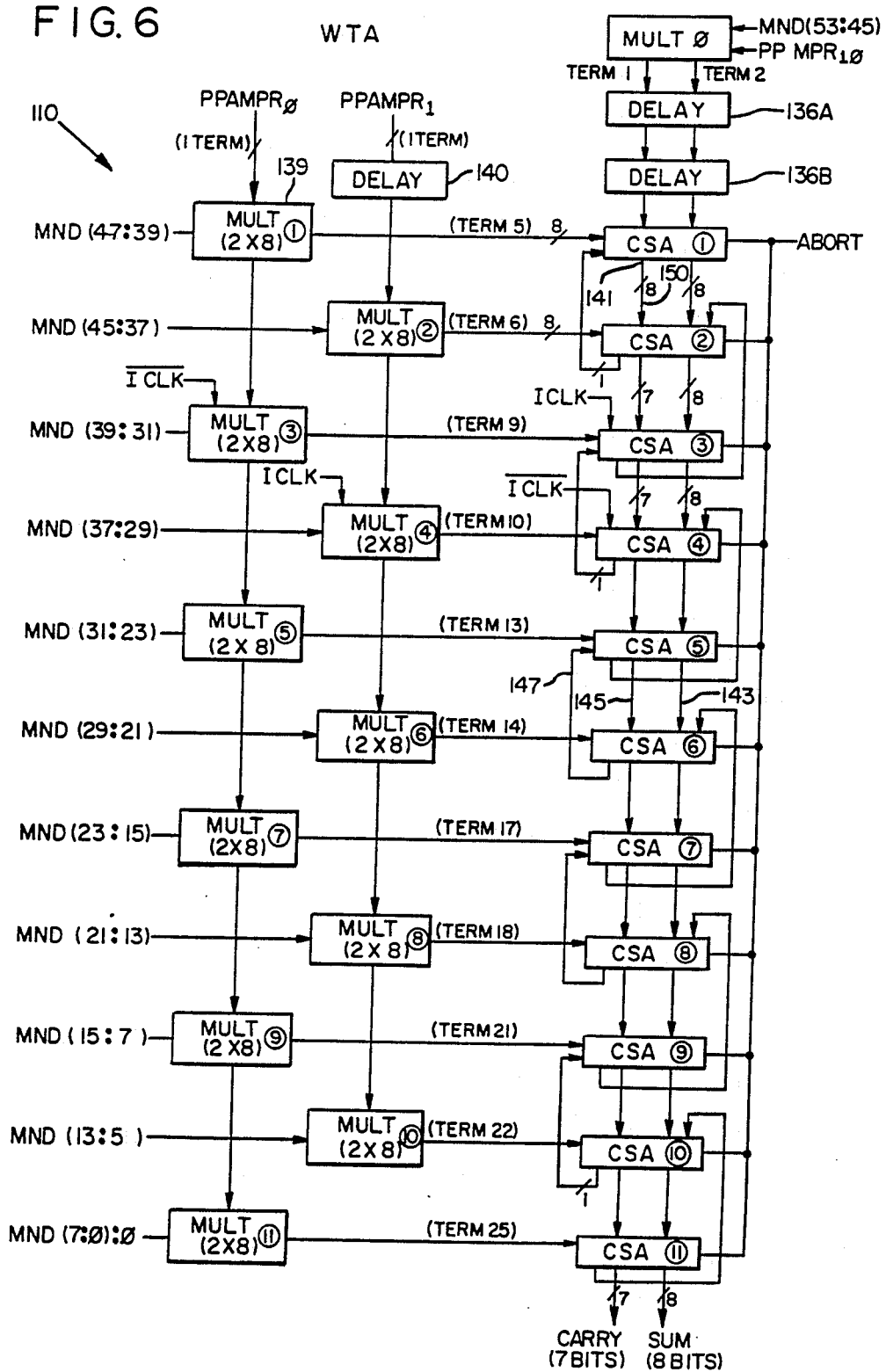
FIG. 6 shows additional detail of the WTA portion of the block diagram of FIG. 3, including partial product term multipliers and carry-save-adder (CSA) cell array.

Referring now to FIG. 6, a functional block diagram of WTA 110 is shown. WTB 120 has the same structure and operation as WTA, although it operates on alternate recode groups. The WTA consists of a series of stages 107 (FIG. 3) including multiplier blocks 139 numbered 0–11 and an array of CSA cells numbered 1–11. The multiplier blocks (0–11) operate on the indicated multiplicand bits to generate 8-bit partial terms. The partial product terms are added in the CS array to form a partial result, which is shifted out the bottom of the array eight bits at a time. While partial product terms are being added in the CSA array, new recode terms PPA MPR$_0$ and PPA MPR, are input at the top to form new partial product terms. The new partial product terms are added in the array on subsequent internal clock cycles so that, in effect, the CSA array is pipelined. These internal operations, however, are transparent to the user because they are clocked by internal clock ICLK which runs much faster than the external clock (CLK1) and is resynchronized automatically (via signal ABORT) each time new data is input.

The specific multiplicand bits input to the multiplier blocks are identified at the left side of FIG. 6. Each multiplier block receives a 2-bit recode term as indicated at the top of the diagram. The recode terms PPA MPR$_0$ are input to multiplier blocks numbered 1, 3, 5, 7, 9 and 11. Recode terms PPA MPR$_1$ are input to multiplier blocks numbered 2, 4, 6, 8 and 10 The PPA MRP$_1$ term information passes through delay block 140 before it is input to the multiplier blocks for timing reasons discussed below Each of the multiplier blocks 139 operates on the multiplicand bits it receives in accordance with the recode terms input from the top of the diagram to produce an 8-bit result equal to one of −2, −1, 0, +1 and +2 times the multiplicand bits input to that particular multiplier, in accordance with second order Booth recoding. The 8-bit results from the 2×8 multiplier blocks are referred to as partial product terms, as distinguished from conventional partial products, which would have the same width as the multiplicand. The partial products terms referred to here are only 8 bits wide. The partial product terms are summed in the CSA Array next described.

The Carry-Save Adder (CSA) Array

Each of the partial product terms is input to a corresponding CSA cell 141 having the same number as the multiplier block 139 that generated that partial product term. An exception is the multiplier block numbered 0 which handles the most significant bits of the multiplicand, bits 45–53. As shown in the upper right of FIG. 6, multiplier block 0 receives both recode groups, MPR$_0$ and MPR$_1$, and the high order multiplicand bits as its inputs. This logic generates the first two partial product terms, term 1 and term 2. Term 1 and term 2 pass through two gate delays 136A and 136B, to arrive at the sum and carry inputs of CSA 1, as shown, one clock cycle later than term 5, for reasons which will become apparent.

The CSA cells 141 are interconnected such that the sum output, 8 bits wide, and the carry output, 7 bits wide, of each CSA are input to the corresponding inputs of the next CSA cell down the array. For example, referring to FIG. 6, note the interconnection between CSA 5 and CSA 6: The sum output of CSA 5 is provided to the sum input of CSA 6 along data path 143. The carry output bits of CSA 5 are provided to the carry input bits of CSA 6 along data path 145. The carry-out bit of each CSA cell is provided to the carry-in bit of the next preceding cell up the ladder. Thus, the carry out bit of CSA 6 is provided over data path 147 to the carry-in of CSA 5.

All of the CSA cells in the WTs are essentially identical Functional detail of a representative CSA cell is shown in FIG. 6A. In FIG. 6A, the adder 75 (marked sigma) is logically equivalent to a conventional 8-bit wide carry-save adder. The interconnection of the adder 75 with the input and output signals of the CSA cell are shown.

In CSA 1, however, all of the carry-out information is input to CSA 2 along data path 150. All of the CSA cells are connected to an abort input which clears the CSAs when the internal clock is restarted. This occurs at the beginning of each new multiply operation. Finally, the sum and carry outputs of CSA 11 are provided to the Add logic 130 (FIG. 3).

Operation of the WTs

Figure 7:
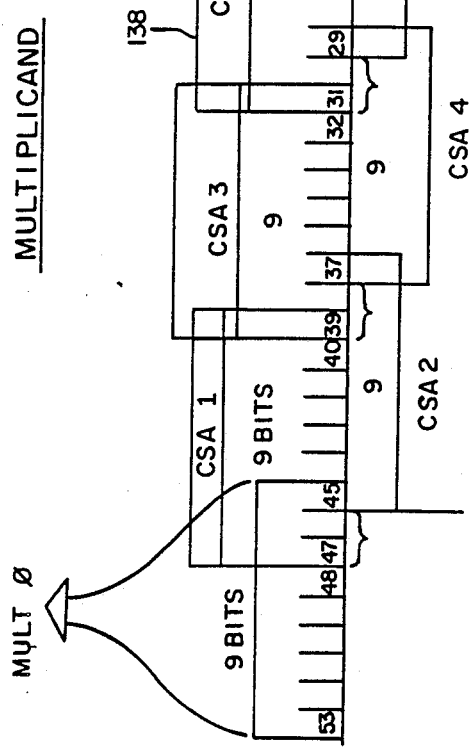
FIG. 7 is a diagram of a 54-bit multiplicand showing segmenting into slices which are identified with respect to the CSA cells shown in FIG. 6.

Explanation of the operation of the WTA and WTB proceeds next as follows. First, the particulars of and reasons for segmenting the multiplicand bits as shown in FIGS. 6 and 7 are discussed. Then, the iterative process for reducing 27 partial product terms in the CSA array is explained.

Referring now to FIG. 7, a diagram is shown representing a 54-bit multiplicand, with the least significant bit, bit 0, at the right of the figure and the most significant bit, bit 53, at the left. Boxes around groups of bits are labeled to indicate which of the CSAs reduce the partial product terms that correspond to those groups of multiplicand bits. For example, referring to FIG. 6, the notation "MND (31:23)" is shown as an input to multiplier block 5. CSA 5 is the CSA cell that receives the partial product term (term 13) generated by multiplier block 5. Referring back to FIG. 7, a box 138 labeled "CSA 5" is shown encompassing bits 31-23.

The multiplicand is functionally partitioned or segmented into a series of seven 8-bit wide "slices." Seven 8-bit slices yields a total of 56 bits, rather than 54, so zeros are inserted in the high order 2 bits in the multiplier 0 block. Nine-bit wide groups of multiplicand bits are input to the 2×8 multiplier blocks, corresponding to each 8-bit segment plus the next less significant bit, so that, in cases where the recode bits indicate multiplication by two, this is easily effected in the 2×8 multiplier blocks by a left shift.

Conceptually, each multiplicand slice is reduced in accordance with the second order Booth recoding in its respective 2×8 multiplier block, and the resulting partial product terms are then reduced in the CSA adders. Booth's algorithm, however, requires shifting each of the partial product terms before it is added to the partial sum. Second order Booth recoding requires a shift by 2 bits before adding each partial product term. In the CSA array, the 2-bit shifting is effected without hardware dedicated to that task, and the width of the adders necessary for reducing partial product terms is substantially reduced, through iterative use of the array, as next described.

Figure 14:
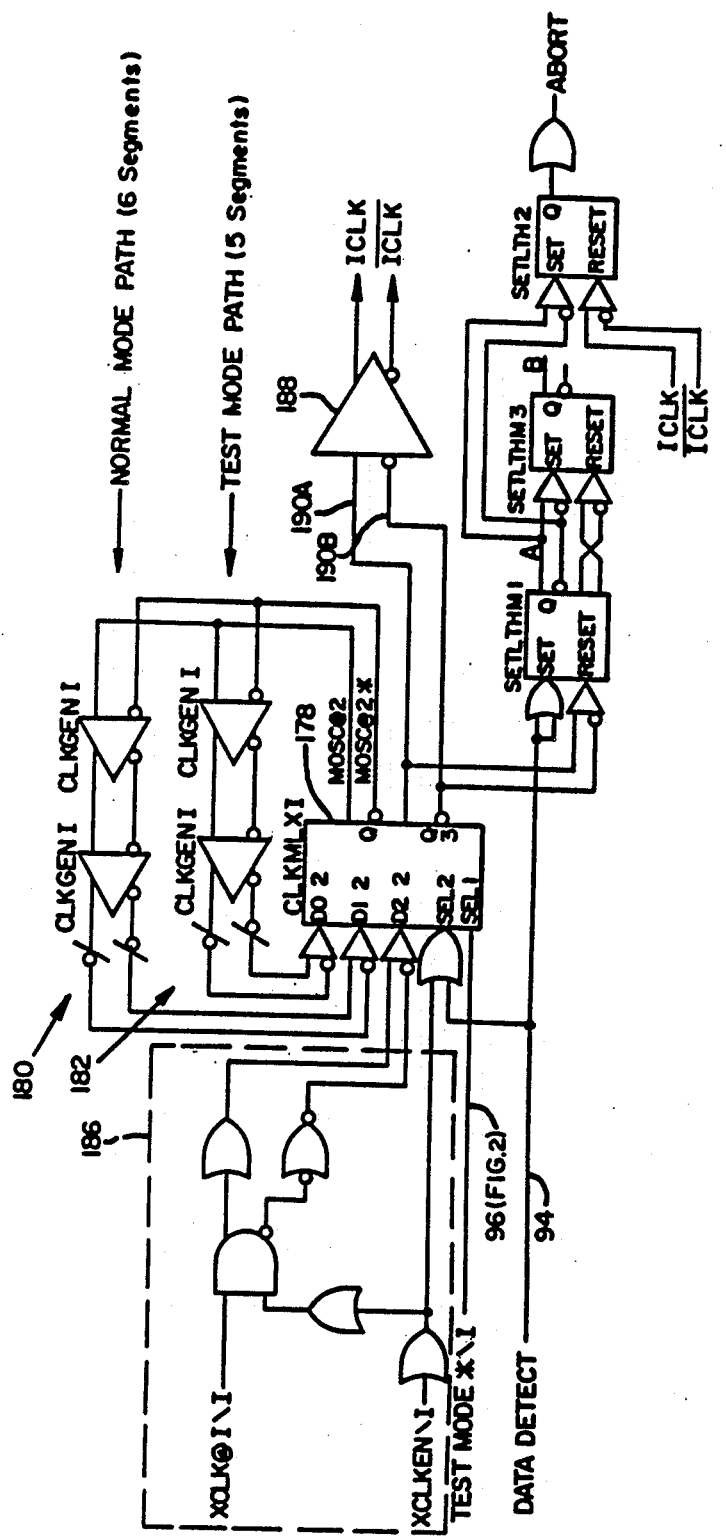
FIG. 14 is a logic diagram of the internal clock circuitry of the multiply block of FIG. 2, including data detect logic to stop and restart the internal clock when new data is received.

The WTA circuitry shown in FIG. 6 is clocked by a two-phase internal clock signal called ICLK and $\overline{ICLK}$ from the circuit of FIG. 14. For simplicity, these clock inputs are shown only at the multiply and CSA blocks numbered 3 and 4, but actually are input to all such blocks. During the first or even phase of the clock (ICLK), the left column of multiplier blocks, multipliers 1, 3, 5, 7, 9 and 11, carry out their respective operations on the multiplicand bits supplied to them in accordance with the PPA $MPR_0$ recode bits. These operations provide partial product terms to inputs of the like numbered (odd) CSA cells. Simultaneously, the same operation is carried out in WTB (not shown) on the same groups of multiplicand bits, in accordance with recode bits $\overline{PPB}$ $MPR_0$. Also during the even phase of the clock, the even numbered CSA cells sum the operands present at their inputs, thereby providing partial sums to the inputs of the odd-numbered CSA cells.

On the second or odd phase of the clock ($\overline{ICLK}$), the even numbered multiplier blocks operate on multiplicand bits present at their inputs, in accordance with recode bits PPA $MPR_1$ (and PPB $MPR_1$ in WTB). The recode group PPA $MPR_1$ (and PPB $MPR_1$ in WTB) is delayed by one-half clock cycle in delay block 140. Also, during the odd phase of ICLK, the odd-numbered CSA cells add the terms present at their inputs Thus, during one full clock cycle, an addition operation is carried out in each of the CSA cells as well as a multiplication in each of the 2×8 multiplier blocks.

It may be observed, most easily in FIG. 7, that a complete set of multiplicand bits are input to the odd numbered multiplier blocks, while a second set of multiplicand bits, also complete but shifted 2 bits less significant, are input to the even numbered multiplier blocks. For example, multiplicand bits 47-39 are input to multiplier block 1 while multiplicand bits 45-37 are input to multiplier block 2. Multiplier block 2 operates on MND (45:37) in accordance with $MPR_1$, whereas multiplier block 1 operates on MND (47:39) in accordance with $MPR_0$. Because $MPR_1$ is 2 bits more significant than $MPR_0$, as shown in FIG. 5, the partial product term resulting from multiplier block 2 (term 6) will have the same significance as the partial product term (term 5) generated in multiplier block 1. Thus, terms 5 and 6 may appropriately be added together (in CSA 2 as described below).

Similarly, all the groups of bits input to the even numbered multiplier blocks are shifted 2 bits from the right from those multiplicand bits input to the odd numbered multiplier blocks, so that pairs of partial product terms are properly aligned for adding in the CSA cells. The pairs in WTA are terms 1-2, 5-6, 9-10, 11-14, 17-18, 21-22. The other terms (3-4, 7-8, etc.) are processed in similar fashion in WTB. Effectively, the entire multiplicand is operated on by recode bits $MPR_0$ in the odd numbered multiplier blocks on the first clock phase to form a first partial product. Next, the multiplicand, shifted 2 bits to the right, is operated on by the recode bits $MPR_1$ in the even numbered multiplier blocks to form a second partial product. The first is added to the second partial product in the CSA cells. As noted above, similar operations occur in WTA and WTB simultaneously. Thus, two recode groups of bits, PPA $MPR_0$ and PPA $MPR_1$, are reduced in WTA during one clock cycle, while the PPB pair of recode groups of bits are reduced in the WTB. A total of four groups of recode bits are reduced in a single clock cycle, thereby retiring 8 bits of the multiplier and producing 8 bits of product. See FIG. 5.

The Next Byte

On the next clock cycle, the four recode groups of bits change to correspond to the next more significant 8 bits of the multiplier, bits 7-15. See ICLK cycle 1 in FIG. 5. The new $MPR_0$ and $MPR_1$ terms are input to the 2×8 multiplier blocks from the top of FIG. 6, and new partial product terms are added in the CSAs.

On each clock cycle, 8 bits of the product are shifted out the bottom of the CSA array, and each CSA effectively becomes 8 bits more significant. This relationship is illustrated in Table 2. In Table 2, time is indicated along the horizontal axis in units of clock cycles. Each clock cycle includes two columns of information, corresponding to the outputs of the CSA cells on the even phase or the odd phase of the clock. The Table shows which partial product terms are summed in each particular CSA during each particular clock cycle. Only the terms processed in WTA are shown. A total of 27 partial product terms are generated and reduced in the two WTAs during a full clock cycle. All the CSAs and delay 0 and delay 1 are cleared by the ABORT line, generated in the internal clock circuitry (FIG. 14) at the beginning of each multiply operation. The value of each partial product term then changes with each internal clock cycle. Accordingly, partial product terms in Table 2 are identified with an upper-case letter suffix indicating when that partial product term was produced, beginning with the letter A to indicate clock cycle 0.

TABLE 2

|  |  | Abort | 195 Cycle 0 Even | 196 Odd | 197 Cycle 1 Even | 198 Odd | Cycle 2 Even | Odd | Cycle 3 Even | Odd |
|---|---|---|---|---|---|---|---|---|---|---|
| Delay | 0 | 0 | 1A,2A |  | 1B,2B |  | 1C,2C |  | 1D,2D |  |
| Delay | 1 | 0 |  | <u>1A,2A</u> |  | 1B,2B |  | 1C,2C |  | 1D,2D |
| CSA | 1 | 0 | 5A |  | 1A+2A+<u>5B</u> |  | 1B+2B+5C |  | 1C+2C+5D |  |
| CSA | 2 | 0 |  | 5A+6A |  | 1A+2A+<u>6B</u> |  | 1B+2B+5C+6C |  | 1C+2C+5D+6D |
| CSA | 3 | 0 | 9A |  | 5A+6A+9B |  | 1A+2A+5B+6B+<br><u>9C</u> |  | 1B+2B+5C+6C+9D |  |
| CSA | 4 | 0 |  | 9A+10A |  | 5A+6A+9B |  | 1A+2A+5B+6B+<br>9C+<u>10C</u> |  | 1B+2B+5C+6C+<br>9D+10D |
| CSA | 5 | 0 | 13A |  | 9A+10A+13B |  | 5A+6A+9B+10B+<br>13C |  | 1A+2A+5B+6B+<br>9C+10C+<u>13D</u> |  |
| CSA | 6 | 0 |  | 13A+14A |  | 9A+10A+13B+14B |  | 5A+6A+9B+10B+<br>13C+14C |  | 1A+2A+5B+6B+<br>9C+10C+13D+<u>14D</u> |
| CSA | 7 | 0 | 17A |  | 13A+14A+17B |  | 9A+10A+13B+14B+<br>17C |  | 5A+6A+9B+10B+<br>13C+14C+17D |  |
| CSA | 8 | 0 |  | 17A+18A |  | 13A+14A+17B+18B |  | 9A+10A+13B+14B+<br>17C+18C |  | 5A+6A+9B+10B+<br>13C+14C+17D+18D |
| CSA | 9 | 0 | 21A |  | 17A+18A+21B |  | 13A+14A+17B+18B+<br>21C |  | 9A+10A+13B+14B+<br>17C+18C+21D |  |
| CSA | 10 | 0 |  | 21A+22A |  | 17A+18A+21B+22B |  | 13A+14A+17B+18B+<br>21C+22C |  | 9A+10A+13B+14B+<br>17C+18C+21D+22D |
| CSA | 11 | 0 | 25A |  | 21A+22A+25B |  | 17A+18A+21B+22B+<br>25C |  | 13A+14A+17B+18B+<br>21C+22C+25D |  |

To illustrate, column 195, representing cycle 0, even phase, shows terms 1A and 2A in Delay 0, term 5A in CSA 1, term 9A in CSA 3, term 13A in CSA 5, etc. Partial product terms just mentioned are added in the respective CSAs to the existing partial sums, in this case 0 because it is the beginning of a new clock cycle During cycle 0-odd phase, while the odd numbered CSA cells are summing their input data, the even numbered multiply blocks are generating the corresponding partial product terms, 6, 10, 14, 18 and 22. Referring now to the column labeled cycle 0-odd, Table 2 shows the terms 1A and 2A present at delay 1, as shown above. In the same half cycle, terms 5A and 6A are summed in CSA 2. At the same time, partial product terms 9A and 10A are summed in CSA 4; partial product terms 13A and 14A are summed in CSA 6, and so on. Each of these pairs of terms are properly aligned with each other. Thus, as indicated in the Table, a series of slices making up a complete multiplicand (divided between WTA and WTB) are added into the even numbered CSA cells during clock cycle 0.

The next clock cycle, cycle 1, is shown in column 197 and column 198 in Table 2. New partial product terms 1B, 2B move through delay 0 on the first phase of the clock and delay 1 on the second phase of the clock. Also on the first phase of the clock, terms 1A and 2A from delay 1 are summed in CSA 1, along with partial product term 5B. 5B is the partial product term generated by multiplier block 1 in accordance with the recode bits presented in the present clock cycle 1.

On the second or odd phase of the clock, column 198, the output of CSA 1, i.e., terms 1A+2A+5B, are summed in CSA 2 with partial product term 6B. Corresponding operations on the other respective terms are carried out on other CSA as shown in the Table.

The progression of terms 1 and 2 through the CSA array is indicated by curved arrows, for example, arrows 232 and 234. Each term moves through two CSA cells (a "cell pair") one clock cycle. Additionally, during each clock cycle, additional partial product terms are added to the partial sums. For example, the new terms added to terms 1 and 2 are underscored in Table 2. As each partial sum moves down the CSA chain, it becomes 8 bits less significant with each clock cycle. Conversely, each CSA cell pair acquires 8 bits greater significance with each clock cycle.

To illustrate the foregoing principle, CSA cell 11, which receives partial product term 25 resulting from the least significant bits of the multiplicand, initially provides a partial sum which is the least significant portion of the product. Seven clock cycles later, bits in CSA 11 have significance equal to 7×8 or 56 bits greater than they had previously. These bits will become bits 54–61 of the product, which will correspond to the least significant 8 bits of the final result, after truncation and subject to rounding described below.

Seven clock cycles are required to generate and add all of the partial product terms in the WTAs to form a complete set of partial sums. The partial sums are shifted out into the Add logic 130 (FIG. 3) to form the result, as next described.

The Add Logic

Referring back to FIG. 3, the 8-bit result from WTA is provided along data path 112 to a carry-save adder. Also provided to the adder is the 8-bit result from WTB, via path 122 and through a delay block 114. This delay is provided because the partial product terms provided by WTB must be aligned with the partial product terms provided by WTA. It may be recalled from FIG. 5 that the recode groups input to WTA, designated PPA, are 4 bits less significant than the PPB terms input to WTB. The significance of each partial sum in the CSA increases by 8 bits each full clock cycle. The partial results provided by WTB are effectively shifted by 4 bits by delaying them ½ clock cycle.

Figure 8:
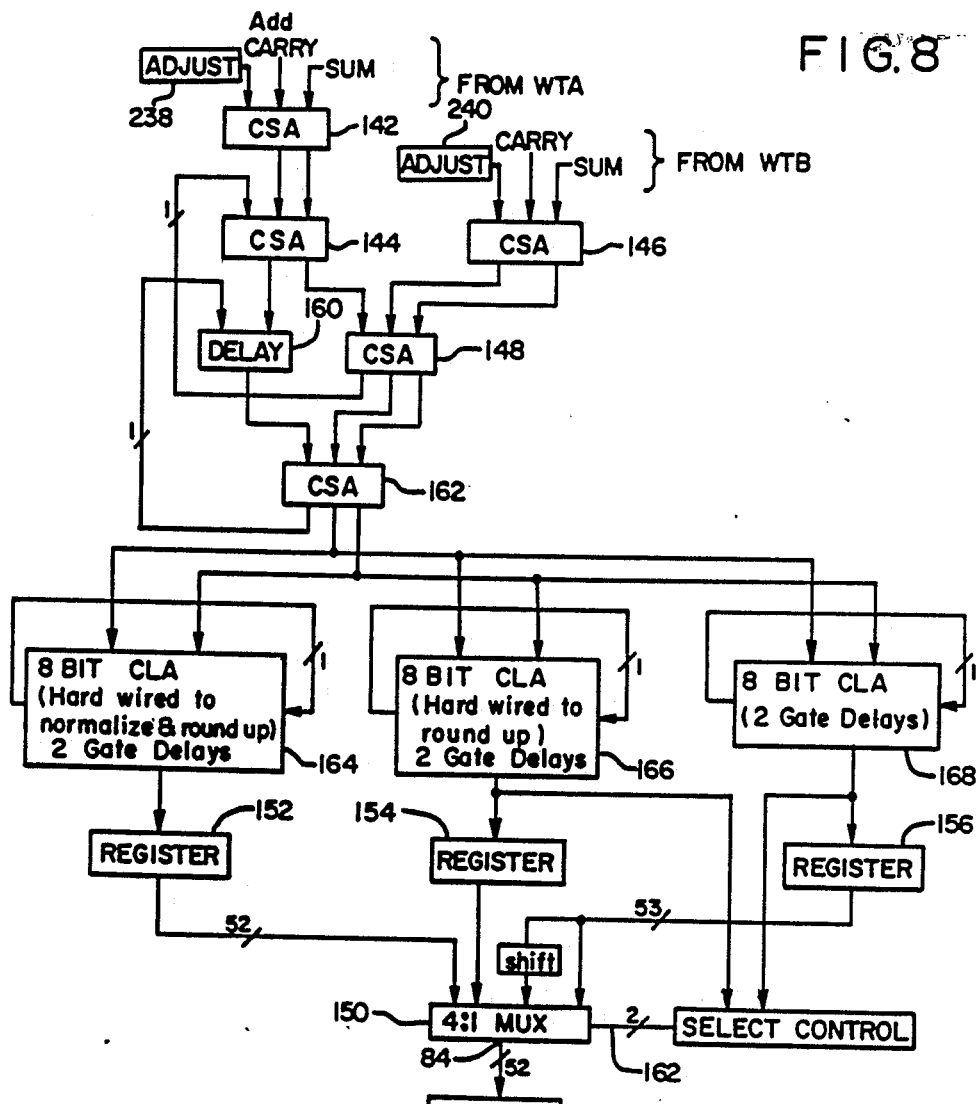
FIG. 8 shows additional detail of the Add logic of FIG. 3.

Referring now to FIG. 8, the sum and carry outputs from the WTA, i.e., from CSA 11, are input to a carry-save adder, CSA 142. Similarly, the sum and carry outputs from WTB are input to CSA 146. Additionally, adjust bits 238 are input to CSA 142 and adjust bits 240 are input to CSA 146.

Figure 9:
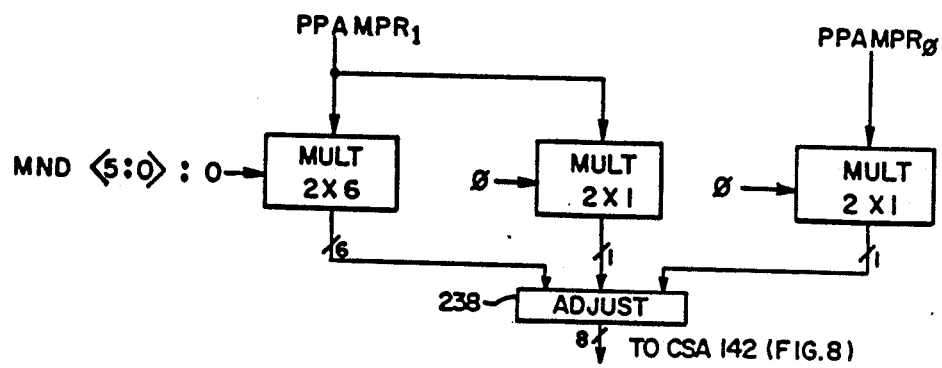
FIG. 9 is a functional block diagram of additional logic that provides the adjust bits input to the Add logic shown in FIG. 8.

The adjust bits are generated by the logic shown in FIG. 9. Only the logic for WTA is shown. The logic for WTB is substantially the same, except that WTB the recode bits input at the top of FIG. 9 are $\overline{PPB}$ recode groups rather than $\overline{PPA}$ recode groups (See FIG. 5). In the WTB case, the adjust bits are identified by numeral 240 in FIG. 8. The adjust bits include the least significant bits of the product, resulting from multiplication of bits 5 through 0 of the multiplicand, as well as subtract bits, which provide a 1 where necessary to add to the result in a two's-complement subtract where needed.

The three inputs to CSA 142 are reduced to two terms which are input to CSA 144. Similarly, the three terms arising from WTB are reduced in CSA 146 to two terms which are input to CSA 148. CSA 148 reduces three terms, two of them from CSA 146 and one term from CSA 144, again to two terms, which are input to CSA 162. The other output from CSA 144 is delayed through Delay 160 in order to align it with the outputs of CSA 148. The resulting three terms are reduced in CSA 162 to form two final terms. The carry-out bit generated in CSA 162 is added in the delay logic 160 such that it increments the next byte, i.e., the data flowing down this chain on the next clock cycle. That byte will have 8 bits greater significance than the present byte.

The final two partial sums provided by CSA 162 are input to each of three 8-bit carry-lookahead (CLA) adders. These adders, only 8 bits wide, give rise to only two gate delays. CLA 164 is hardwired to normalize the result and round up. CLA 166 is hardwired to round up without normalization. Finally, CLA 168 merely passes the result without rounding. The outputs of each of the three CLAs are shifted into a respective register, 8 bits at a time, to form the mantissa portion of the product.

Accordingly, the 54-bit result is accumulated in each of three registers 152, 154 and 156. The outputs of the registers are provided to multiplexer 150. Additionally, the output of register 156 is shifted by 1 bit and provided to a fourth input to multiplexer 150. Finally, select control logic controls multiplexer 150 via control path 162 to provide any one of the four forms of result.

Referring back to FIG. 2, the selected result is provided over data path 84 to an output latch/register 62. It is combined there with exponent information provided over data path 86 to form the complete floating point product. The output latch/register is register Z on FIG. 1. The output register Z may be operated in a register mode, and clocked by clock signal CK2 so that the multiply result is effectively synchronized with the system clock.

Referring back to FIG. 2, the result formed in the output latch/register 62 includes the mantissa portion, provided over data path 84 in the exponent portion provided over data path 86. The exponent block 66 is disclosed in greater detail in FIG. 17

Exponent Logic

Figure 17:
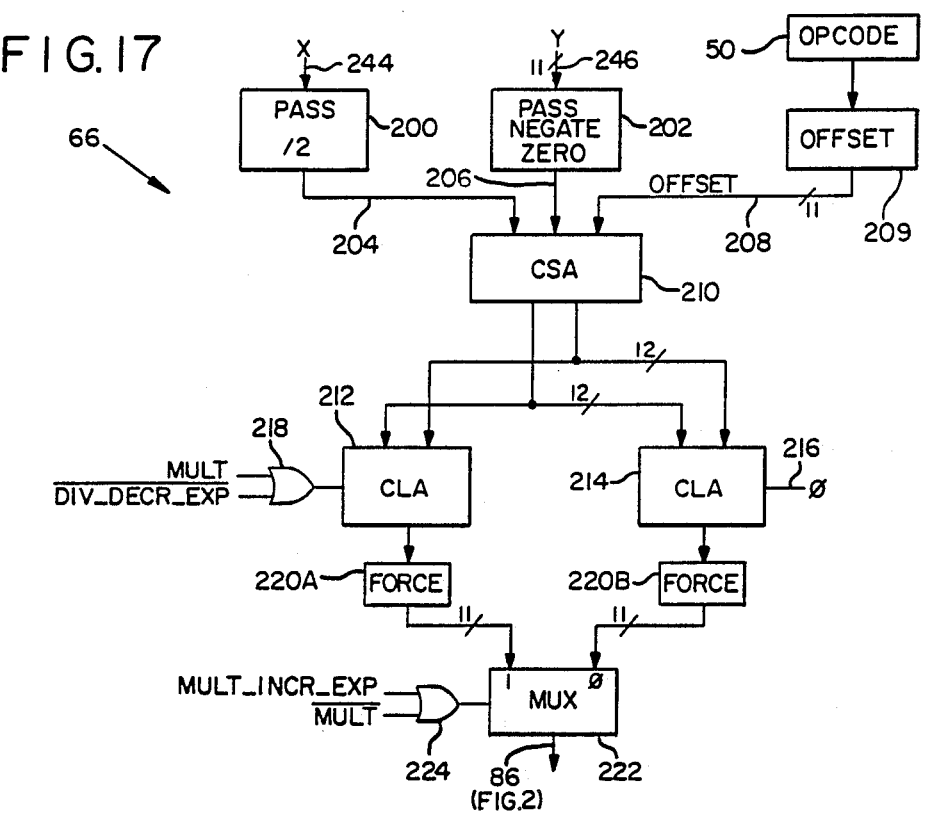
FIG. 17 is a register transfer level diagram of the exponent logic block of FIG. 2.

The exponents of the X and Y operands are input to the exponent logic block 66 as shown in FIG. 2. Referring now to FIG. 17, the exponent portion of the X operand, 11 bits wide, is input over data path 244 to logic block 200. The exponent portion of the Y operand, also 11 bits wide, is input over data path 246 to logic block 202. The opcode logic 50 decodes the current instruction and controls the exponent logic accordingly. Thus, logic block 200 can pass the X operand exponent, as it would in a multiply or divide operation, or divide that exponent by 2, as it would in a square root operation. Logic block 202 can pass the Y exponent, as it would in a multiply operation; negate the Y exponent, as it would in a divide operation, or zero the Y exponent as appropriate, for example, in a square root operation.

The opcode logic 50 also controls offset logic 209. The offset logic generates an offset term for adjusting the exponent to correct a bias.

The results from logic blocks 200, 202 and 209 are provided over data path 204, 206 and 208 respectively, to CSA 210 which sums these three terms to form two terms. The outputs of CSA 210 are provided simultaneously to the inputs of CLA 212 and CLA 214 where they are summed to determine a final exponent value The final exponent value depends upon whether or not the result need be normalized and, independently, depends upon whether or not the mantissa logic indicates a need to increment or decrement the exponent The exponent is incremented in CLA 212 by virtue of the carry input from logic OR gate 218 when a multiply is performed (MULT=logic 1) or when the logic signal divide-decrement-exponent is false. The carry input to CLA 214, data path 216 is a hard zero, so the exponent is not incremented in CLA 214.

The logic OR gate 224 on the control input to MUX 222 selects the incremented exponent term (from CLA 212) in the event either $\overline{\text{MULT}}$ is high (the operation is not multiply) or multiply-increment-exponent is asserted. Thus, in a multiply operation, the incremented exponent will be selected in MUX 222 as needed.

The outputs of CLA 212 and CLA 214 are passed through force logic 220A and 220B, respectively. This logic forces the exponent to all 1's to indicate an overflow condition or all zeros to indicate an underflow condition, in accordance with industry standards. This architecture for determining the exponent in both incremented and non-incremented form at the same time, and then selecting the appropriate result, minimizes delay time.

Because the input to the floating point multiplier is effectively clocked in by CK1 and the output becomes available on the next subsequent rising edge of CK2, the multi-stage pipelining in WTA and WTB is transparent to the user. Instead, the floating point multiply appears to be single pipeline stage in which the latency is equal to the operation delay.

Figure 10A:
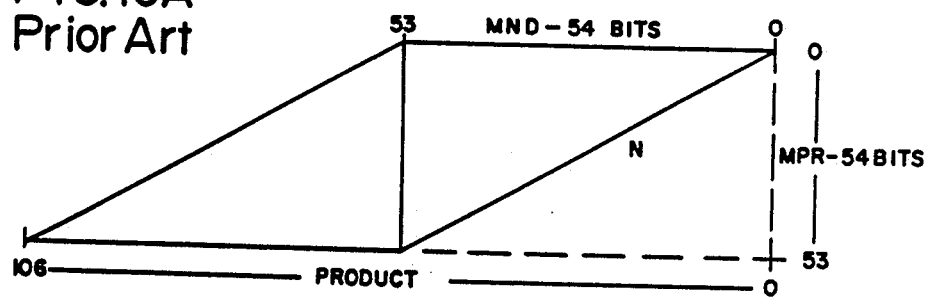
FIG. 10A is a conceptual diagram illustrating multiplication of a 54-bit multiplicand by a 54-bit multiplier using a conventional sequential technique.

The multiply operation described above is compared conceptually to previous methods in FIGS. 10 and 11 Referring to FIG. 10A, conventional sequential multiplication of a pair of 54-bit operands is illustrated. The multiplicand is successively multiplied by each of the 54 multiplier bits in ascending order of significance. Each of the 54 partial products is shifted one bit to the left and then added to the partial sum to form a new partial sum. Thus, after 54 multiply, shift and add operations, the 106 bit product is determined. Typically, the least significant 53 bits of the product are discarded. This approach requires 54 stages of adders. Accordingly, the hardware necessary to implement this approach is substantial and the number of gate delays incurred unacceptable for intensive computing.

Figure 10B:
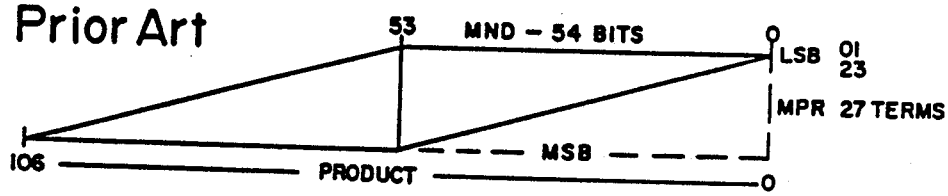
FIG. 10B is a conceptual diagram illustrating use of 2-bit modified Booth recoding to perform the same multiplication using one-half the number of full adder stages required to implement the technique of FIG. 10A.

Referring now to FIG. 10B, use of second order Booth recoding is illustrated as applied to the multiplication of a 54-bit multiplicand by a 54-bit multiplier. Two-bit recoding reduces the multiplier to 27 terms rather than 54 terms. The multiplicand is successively multiplied in accordance with each recode term, shifted two bits, and then added as above. This reduces the number of delays approximately in half though complexity increases somewhat. It remains necessary to have full width (54-bit) adders.

Figure 11A:
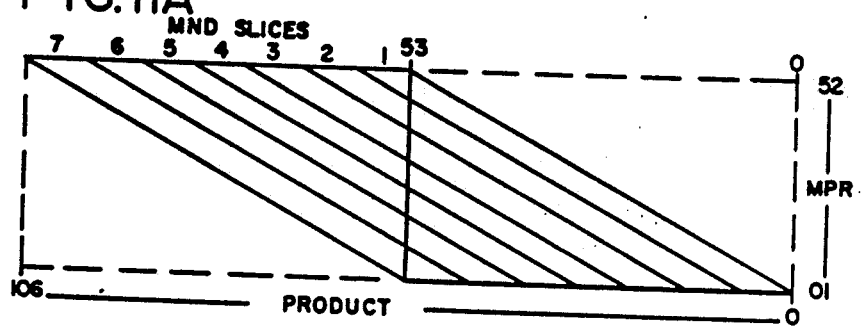
FIG. 11A is a conceptual diagram of a multiplication technique according to the present invention, including slicing the multiplicand into a series of 8-bit slices.

FIG. 11A illustrates segmenting the multiplicand, here into seven 8-bit "slices". Each slice is multiplied by a multiplier bit, shifted right one bit, and added to the partial sum. Segmenting allows the use of small CSA cells. This concept can be implemented in accordance with the present invention, in a chain of 16-bit wide CSA cells, 53 cells high.

Figure 11B:
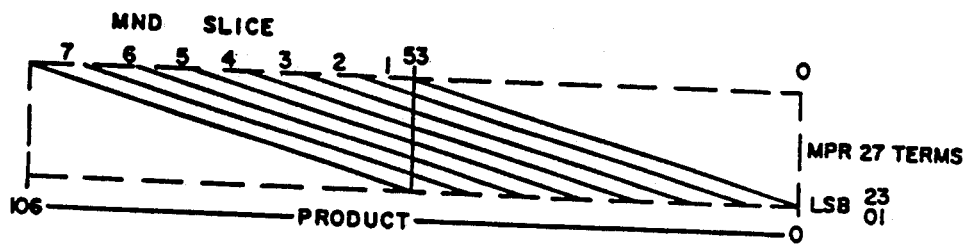
FIG. 11B is a conceptual diagram of a multiplication technique according to the present invention including slicing the multiplicand into a series of 8-bit slices and using 2-bit modified Booth recoding

FIG. 11B is a conceptual diagram of a multiply operation as performed in the preferred embodiment. The multiplicand is segmented into seven 8-bit slices to allow use of a regular array of relatively small CSA adders. Second order Booth recoding reduces the multiplier terms to 27.

Figure 12:
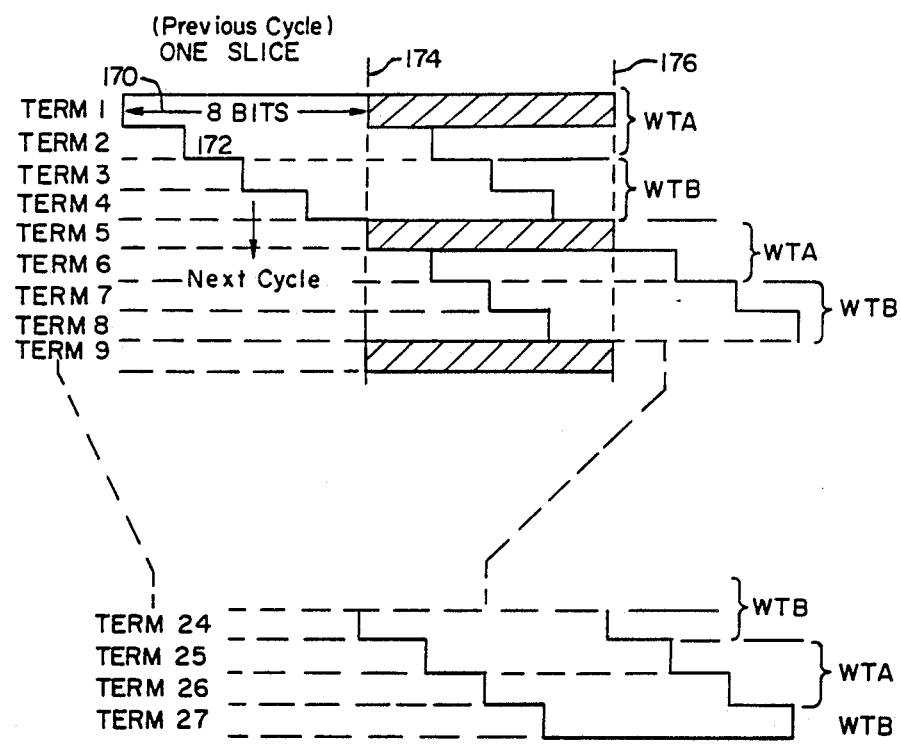
FIG. 12 is a fragmentary conceptual diagram of the technique of FIG. 11B showing the relative binary significance among the partial product terms associated with one slice of the multiplicand in the WT logic of FIG. 6, using the technique of FIG. 11A.
Figure 13:
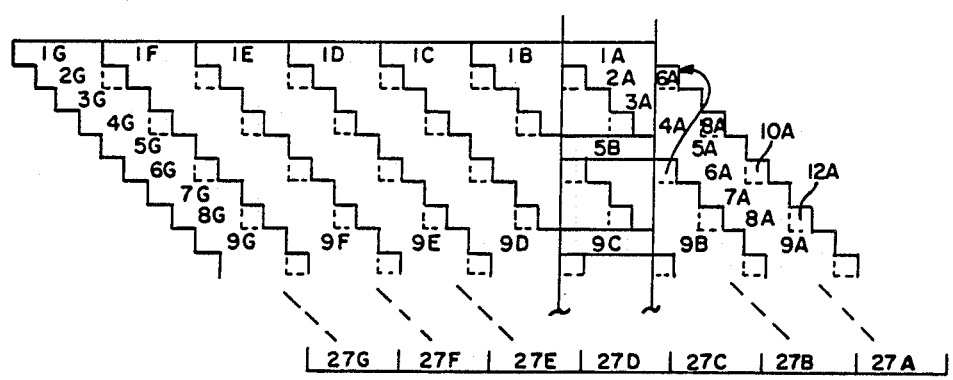
FIG. 13 is a fragmentary conceptual diagram showing the relative significance of the partial product terms, numbered 1–27, during successive cycles in carrying out a multiply operation in the WTA of FIG. 3 (and in the WTB, not illustrated), in which successive half-cycles of time are indicated by upper-case letters suffixed to the term numbers, A representing the first half-cycle, and in which the binary significance of the bits of each term are indicated by horizontal position, so that all of the bits in each individual vertical column have the same significance, and therefore are added together in WTA/WTB at the appropriate time.

FIG. 12 is a conceptual diagram showing additional detail of the multiplication technique illustrated in FIG. 11 as implemented in accordance with the present invention. FIG. 12 shows one of the 8-bit wide multiplicand slices of FIG. 11B. The partial product term numbers are set forth down the left side of FIG. 12. On the right side of FIG. 12, the allocation between WTA and WTB of the various terms is shown The terms are interleaved in pairs so that, for example, terms 1 and 2 are reduced in the WTA while terms 3 and 4 are reduced in WTB, and so on.

In FIG. 12, the horizontal position of each bit indicates its relative significance, with the more significant bits toward the left. It may be observed here that each term is 2 bits less significant than the next preceding term. For example, the row labeled term 1 shows an 8-bit byte 170. In the row labeled term 2, a second byte 172 is shown 2 bits offset to the right from term 1. This is the two-bit shift required by the modified Booth's algorithm.

All of the bits in each column in FIG. 12 are summed in the CSAs to form the product. To illustrate, consider the 8 bits of information contained in the column bounded by dashed line 174 and dashed line 176. The shaded term shown on the row labeled term 5 lies within these bounds. In the row labeled term 9, it appears that the bits comprising term 9 on the next clock cycle fall within the same column, so they will be summed with term 5 of the present cycle. Similarly, it appears that the bits comprising term 1 during the preceding cycle also fall within this column so that they too summed together with term 5 of the present cycle. This relationship is apparent in Table 2 above. Assuming that the clock cycle illustrated in FIG. 12 is cycle 1, the terms summed during that clock cycle are those having a suffix B in Table 2. Referring to Table 2, terms 1A and 2A are summed in CSA 1, together with term 5B. In other words, term 1 in the preceding clock cycle is summed with term 5 of the present clock cycle. This correlates with the illustration in FIG. 12 described above. During the next clock cycle, cycle 2, the present partial sum is added together with 9C, i.e., term 9 of the next clock cycle. That is a term that falls between the boundaries 174 and 176 in FIG. 12, so that term is aligned with term 5B and 1A. Table 2 shows all of the terms as they are added in the CSAs over four clock cycles from the beginning of a multiply operation. The 53×53 multiply generates 106 bits of result (53+53). To shift out this many bits requires 106/8 cycles, or 14 clock cycles. It, therefore, takes 7 cycles to "fill" the WTA with a 54-bit terms, and it takes another 7 cycles to completely "drain" the 54-bit data from the array.

Internal Clock Circuitry

FIG. 14 is a logic diagram of the internal clock circuitry of the multiplier of FIG. 3. Multiplexer circuitry 178 is used to form an oscillator to generate the clock signal. A first feedback loop 180, including a pair of differential buffers, completes the oscillator circuit for normal operation. A second feedback path 182 is provided for test mode operation, in which the internal clock is run about 10% faster than its usual speed for purposes of testing an integrated circuit. The test mode is selected by asserting the test mode control line 96. The logic shown within dashed box 186 is used only for design debug in the integrated circuit manufacturing process. The clock signals are taken from the flip-flop outputs along paths 190A and 190B, the latter being the inverted clock signal. These are input to buffer circuitry 188 and then distributed to the circuit elements as needed.

Figure 15:
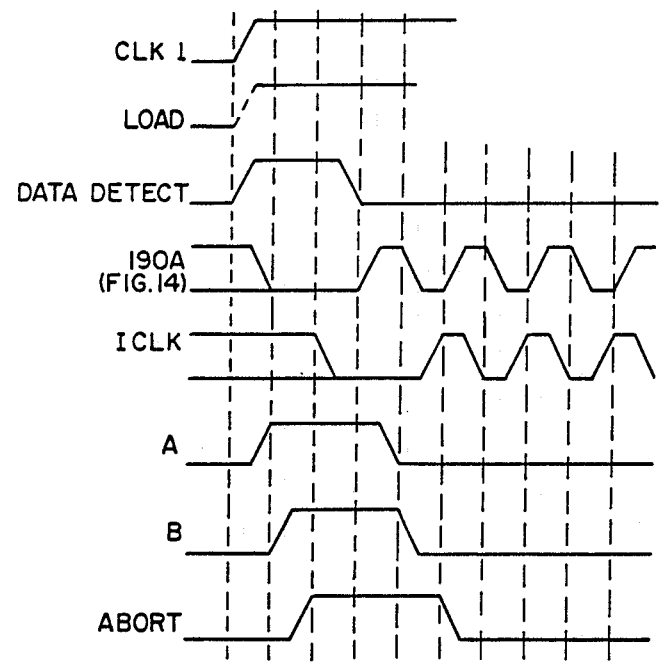
FIG. 15 is a timing diagram showing the operation of the internal clock of FIG. 14 including timing of the abort signal used to clear the multiply block of FIG. 2 when a new operation begins.

Referring back to FIG. 2, the IO control circuitry 92 provides a data detect signal on path 94 to signal the arrival of new data. That signal line 94 is input to the flip-flop circuit 178 to stop the internal clock and to asserted the abort line to clear the multiplier circuitry. Thus, when new data is detected, the internal clock is stopped and the abort line inserted to clear all of the multiplier circuitry. The internal clock then restarts to begin the multiply operation. In the preferred embodiment, the internal clock and the multiply circuitry runs at nominally 500 MHz. The timing and relationships in the internal clock circuitry are illustrated in FIG. 15.

Figure 16:
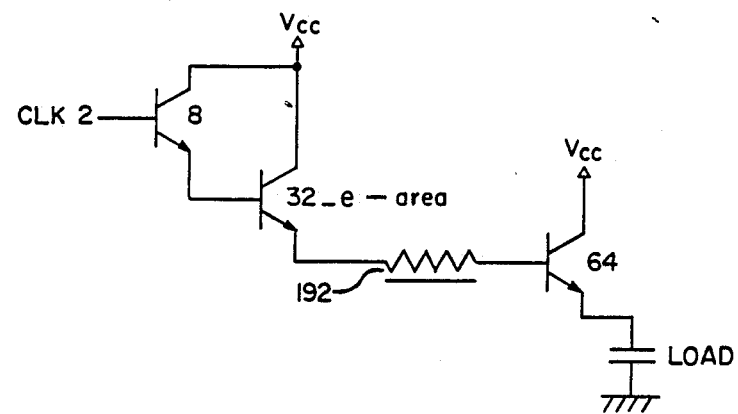
FIG. 16 is a schematic circuit diagram of the integrated clock driver circuitry for distributing and buffering the external clock signal CK2 in the FMPY of FIG. 1.

FIG. 16 shows a transistor level schematic diagram of the circuitry used to buffer and distribute the CLK 2 input signal. It is conventional to buffer an input signal of this type using, for example, a low output impedance amplifier stage such as a Darlington pair. However, distribution of the CLK2 over the area of the VLSI integrated circuit combined with the load placed upon the amplified CLK2 signal at remote locations to cause clock skew because of the capacitance of the loads. The circuitry shown in FIG. 16 is effective to minimize clock skew of that nature. As shown in the figure, a first stage is used including transistors having eight X and 32 X emitter areas, respectively, configured to form a Darlington pair. The capacitive/resistive nature of the distribution path across the integrated circuit is represented here by symbol 192. At a position on the integrated circuit remote from the first stage of the buffer, a second amplifier stage is provided having a 64 X relative emitter size. That final stage drives the load. This circuitry has been found effective to lower the RC time constant of the clock 2 distribution circuitry in order to sufficiently minimize skew.

Borrow Mode Subtract

The carry flag in the ALU is asserted whenever there is a carry out on the most significant result bit during arthimetic operations and set equal to the last bit shifted out during shift and rotate operations. However, the effect of the borrow mode bit in the mode register on the carry flag is implemented in a novel way. The following table illustrates the effect of borrow mode on the carry flag.

TABLE 3

Truth table for borrow mode logic.

| $C_{OUT}$ | SUBTRACT | BORROW MODE | CARRY FLAG | $C_{IN}$ |
|---|---|---|---|---|
| 0 | 0 | 0 | 0 | 0 |
| 0 | 0 | 1 | 0 | 0 |
| 0 | 1 | 0 | 0 | 0 |
| 0 | 1 | 1 | 1 | 0 |
| 1 | 0 | 0 | 1 | 1 |
| 1 | 0 | 1 | 1 | 1 |
| 1 | 1 | 0 | 1 | 1 |
| 1 | 1 | 1 | 0 | 1 |

Some examples are:

| OPERATION | BORROW MODE = 0 | BORROW MODE = 1 |
|---|---|---|
| (+2) + (−1) | CARRY = 1 | CARRY = 1 |
| (+2) − (+1) | CARRY = 1 | CARRY = 0 |
| (+1) + (−1) | CARRY = 1 | CARRY = 1 |
| (+1) − (+1) | CARRY = 1 | CARRY = 0 |
| (+1) + (−2) | CARRY = 0 | CARRY = 0 |
| (+1) − (+2) | CARRY = 0 | CARRY = 1 |

Borrow mode does not influence the function of the ALU, only the definition of the carry flag. The carry flag can be used in two ways. If the borrow mode bit is a 0, then the carry flag is set if there is a carry out of the ALU. This is the conventional definition of a carry out bit and is compatible with several available microprocessors. If the borrow mode bit is a 1, then the carry flag is set if there is a carry out of the ALU during additions, or if there is no carry out of the ALU during subtractions. The logic shown in FIG. 23, then, provides for the carry flag to be compatible with microprocessor systems which require a borrow flag or signal. This concept is implemented in the logic shown in FIG. 23 as follows. The carry flag 260 is passed through an XOR 256 and provided to the carry input of the ALU unit 252. Similarly, the carry out signal from the ALU 252 is passed through an XOR 254 and then provided to the carry flag 260. The other inputs to the other two XOR gates are tied to the output of an AND gate 258. Thus, the carry flag input to the ALU and the carry output from the ALU will be inverted if, and only if, the output of AND gate 258 is high or true. The signal should be inverted only in forming a subtraction and in borrow mode, as distinguished from the conventional carry mode used by manufacturers of certain microprocessors. Thus, subtract and carry mode signals are input to AND gate 258 to control the XORs. This logic is contained in the INTALU block 244 in FIG. 18.

Floating Point Arithmetic

Figure 18:
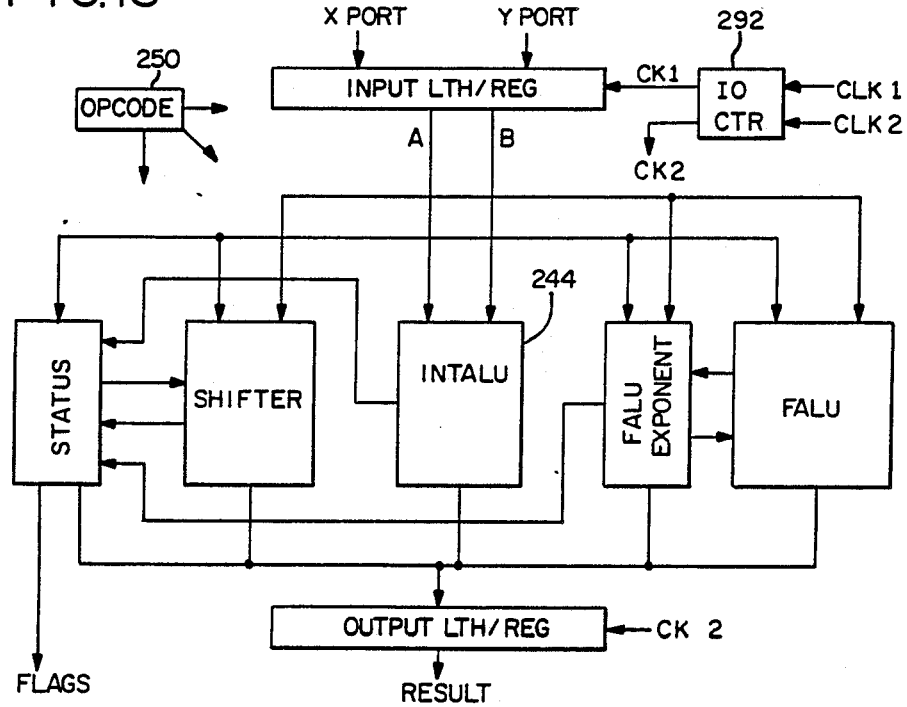
FIG. 18 is a block diagram showing the microarchitecture of the Functional Unit in the FALU implementation of the device of FIG. 1.
Figure 19:
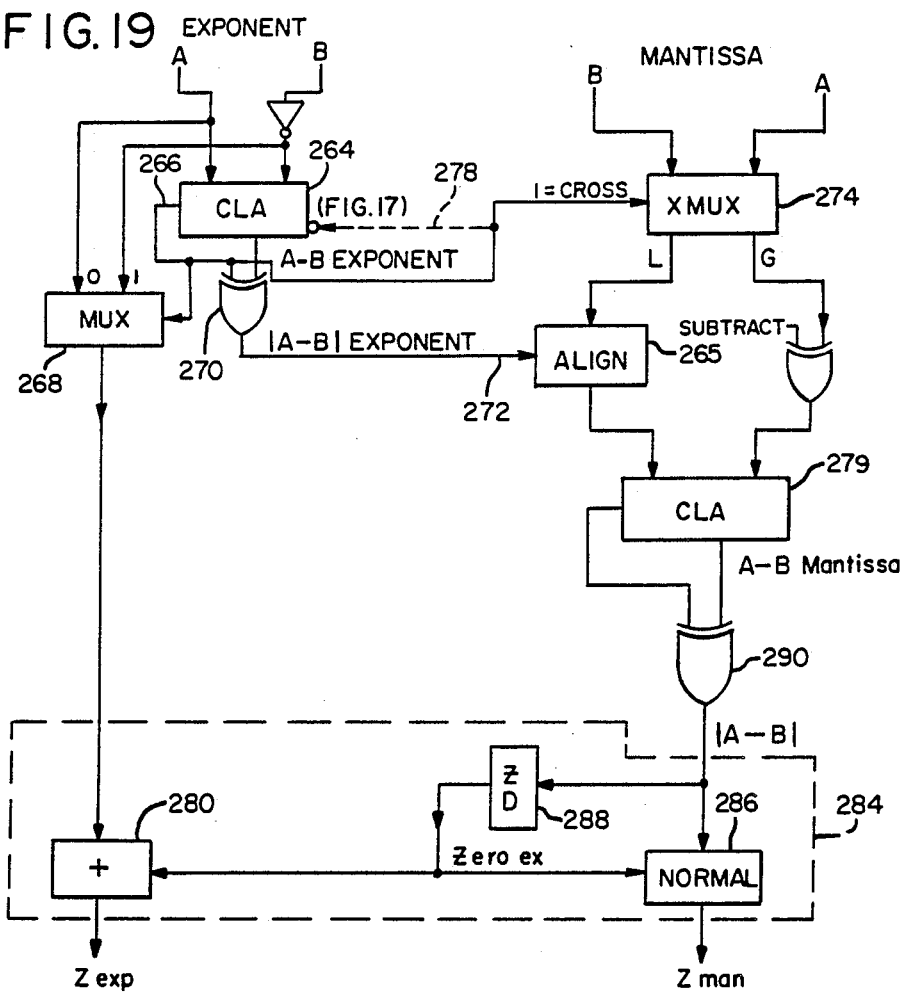
FIG. 19 is an RTL diagram of the absolute value subtract logic in the FALU block of FIG. 18.

Referring now to FIG. 19, a register transfer level diagram is shown of the absolute value subtract logic in the FALU block of FIG. 18. Addition and subtraction of floating point operands requires initially that the operands be adjusted to have the same exponent value so that their mantissas are aligned. The question is complicated because there is no way to detect at the outset which operand has the larger exponent nor which has the larger mantissa. The present invention includes a novel logic scheme to perform the necessary operations with minimum delay and a novel method of implementing that logic in a bipolar integrated circuit.

Referring now to FIG. 19, the exponents of two operands A and B are input at the top of the diagram to a carry-lookahead adder (CLA) 264. The same inputs are also provided to a multiplexer 268 for selecting one of the two. In order to align the mantissas, the difference between the two exponent values must be determined, that being the number of bits of shift required to align the mantissas, and it must be determined which exponent is the larger so that the smaller mantissa may be subtracted from the larger mantissa.

To determine which of the exponents is the larger, the G (generate) signal from the second or intermediate stage of CLA 264 is brought out on path 266 and input to control the multiplexer 268, N-bit wide XOR 270 and cross-multiplexer (XMUX) 274. Additionally, the G signal on path 266 is presented to the carry input to CLA 264, although it is done internally in the third stage of the CLA, as described below. This is the invert signal The invert signal is true when B has greater magnitude than A. In that event, the invert signal controls MUX 268 to select the B exponent for input to the adder 280 The invert signal on line 266 also controls the XMUX 274 to cross the mantissas so that the B mantissa is provided to the G (greater) path into the CLA 279. Finally, the invert signal is input to XOR 270 to cause it to invert the sum bits from the CLA 274 to form the absolute value of the difference between the exponents. The output of XOR 270 is provided over control path 272 to control the align register 265 to right shift the lesser mantissa bits by a number of bits equal to the difference between the exponents.

The absolute value of the difference between the two exponents is determined as follows. In the event that B is less than A, the absolute value of the difference is the same as the difference, and it passes through the XOR 270 without inversion because the invert signal on path 266 is low. If B is greater than A, the difference A minus B is a negative number which must itself be negated to form the absolute value of the difference. Two's complement negation requires inverting the bits and then adding 1 or, conversely, subtracting 1 and then inverting the bits. The latter approach is implemented here. One is subtracted because the invert signal is provided to the carry input of the third stage in CLA 264, as indicated by dashed line 278. Providing the carry-in bit to the third stage of the CLA 274 effectively subtracts 1 from the A minus B quantity. The XOR 270 then inverts that quantity, bit by bit, to complete the negation required to form the absolute value.

In the case where the exponents are equal, the invert signal on path 266 is not asserted and the A exponent is passed through MUX 268 to the adder 280 discussed below Similarly, the A mantissa would pass along the greater path to a CLA 279. However, this may be incorrect in the sense that the B mantissa may actually be greater than the A mantissa Accordingly, CLA 279 includes absolute value circuitry as does CLA 264 Accordingly, the correct result mantissa, |A−B| is used.

Finally, normalization logic, outlined by dashed box 284, is provided to normalize the results if necessary. The normalization logic includes logic 286 for shifting the result mantissa bits if necessary; 0 detect logic 288 and adder 280 for incrementing or decrementing the exponent The floating point result is normalized such that the hidden bit is equal to 1.

Figure 20:
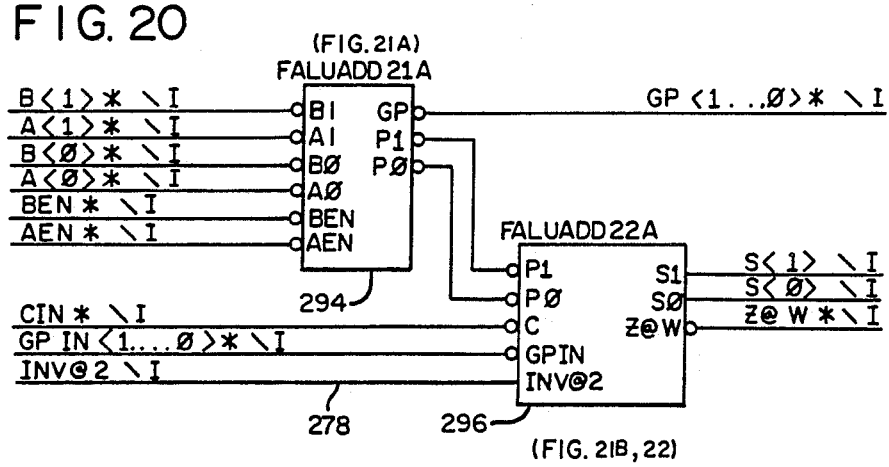
FIG. 20 shows a two-bit adder slice employed in each of the CLA adders of FIG. 19.

FIG. 20 illustrates in greater detail the architecture of the absolute value CLAs (264 and 279) of FIG. 19. Referring now to FIG. 20, a logic diagram is shown of a 2-bit slice of the first and third stages of the CLA adders of FIG. 19. The first stage adder 294 has inputs for the A and B operands, 2 bits wide each, and A and B enable signals, (not material here). The stage 1 logic 294 generates G and P bits at the GP output; and 2 propagate bits P0 and P1.

The third stage in the CLAs 264 and 279 is represented by the block 296. The inputs to block 296 are the propagate P0 and P1 output from block 294; CIN, the global carry in signal; GPIN, the generate and propagate bits accumulated from all of the bits in the adder; and INV@2. INV@2 is taken from the G output of the last (most significant) slice. The outputs provided by block 296 are 2 sum bits S0 and S1, and @W a 0 detect bit.

The XORs 270 and 290 are implemented inside the logic block 296 as further explained below.

Figure 21A:
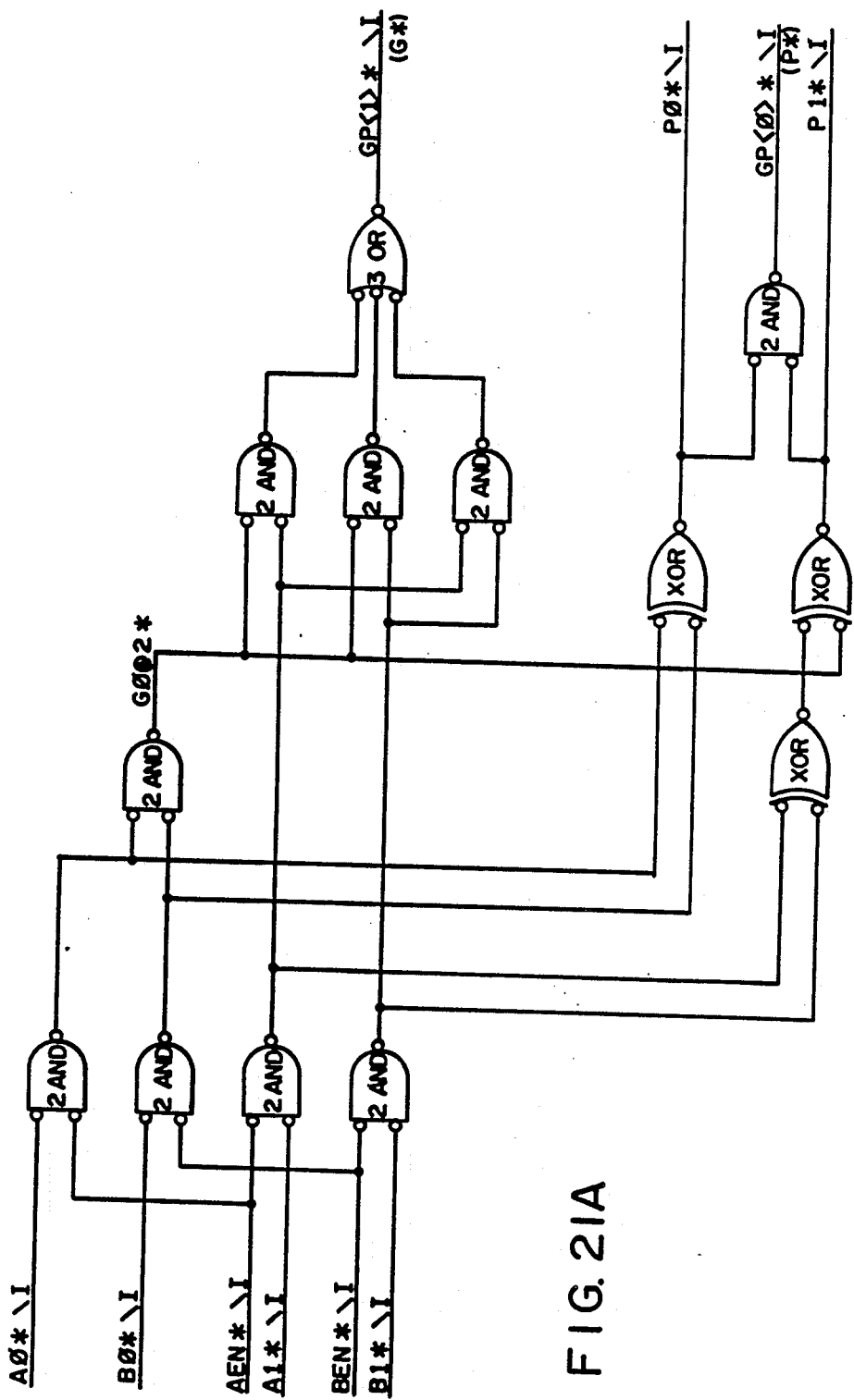
FIG. 21A is a logic simulation diagram showing the generate and propagate logic for the two-bit adder slice of FIG. 20.

FIG. 21A is a logic simulation diagram of the generate and propagate logic log 294 of FIG. 20. Operation of this logic is known to persons skilled in carry-lookahead addition techniques.

FIG. 21B is a logic simulation diagram of the logic block 296 of FIG. 20. This logic diagram shows how the XORs 270 and 290 are integrated into the third stage CLA logic. The function of those XORs is carried out by XORs 298 and 299 in the figure.

Figure 22A:
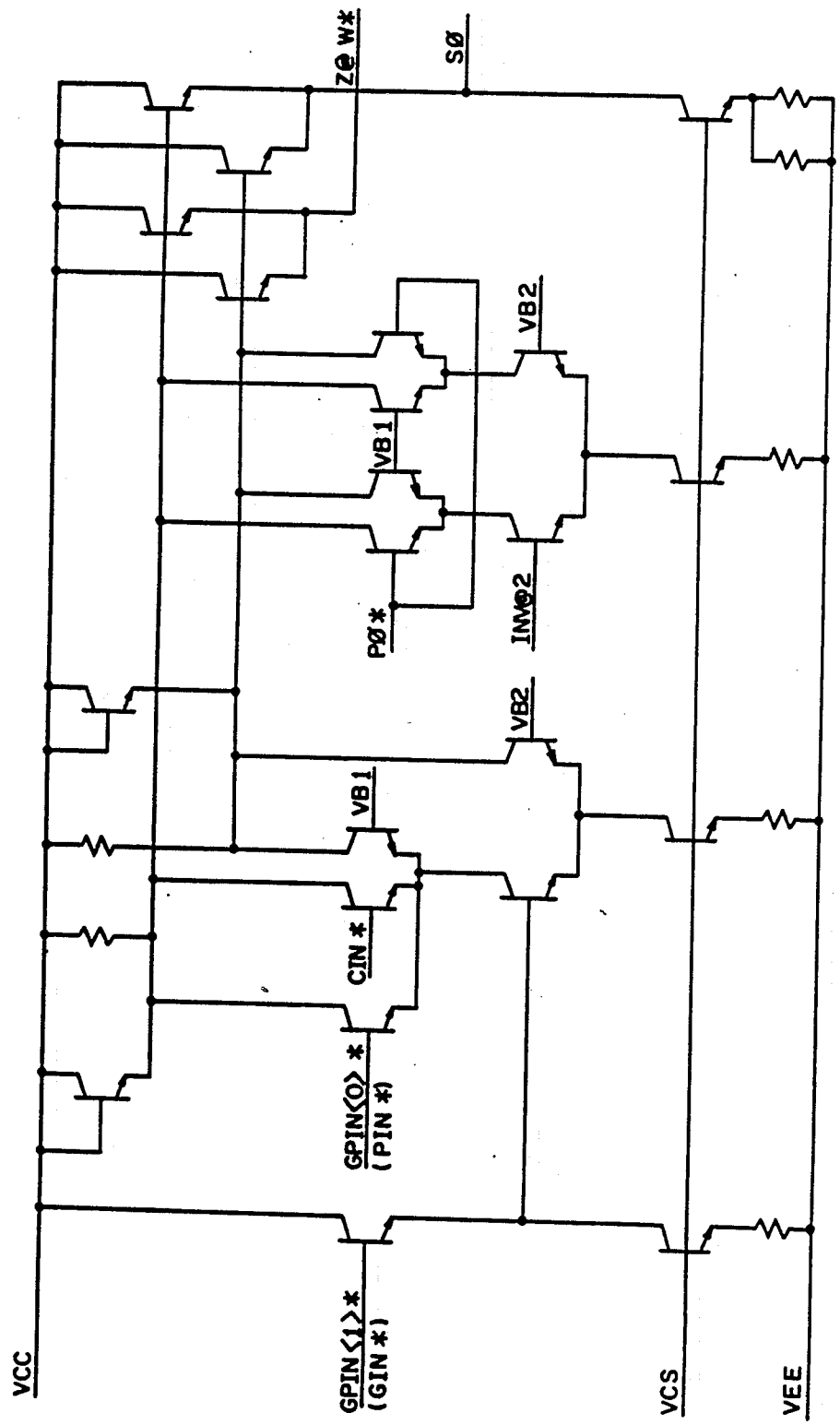
FIG. 22A is a transistor-level diagram of the LSB portion of the two-bit adder slice of FIG. 20.

FIG. 22A is a transistor level schematic diagram of the least significant bit portion of the logic block 296 of FIG. 20.

Figure 22B:
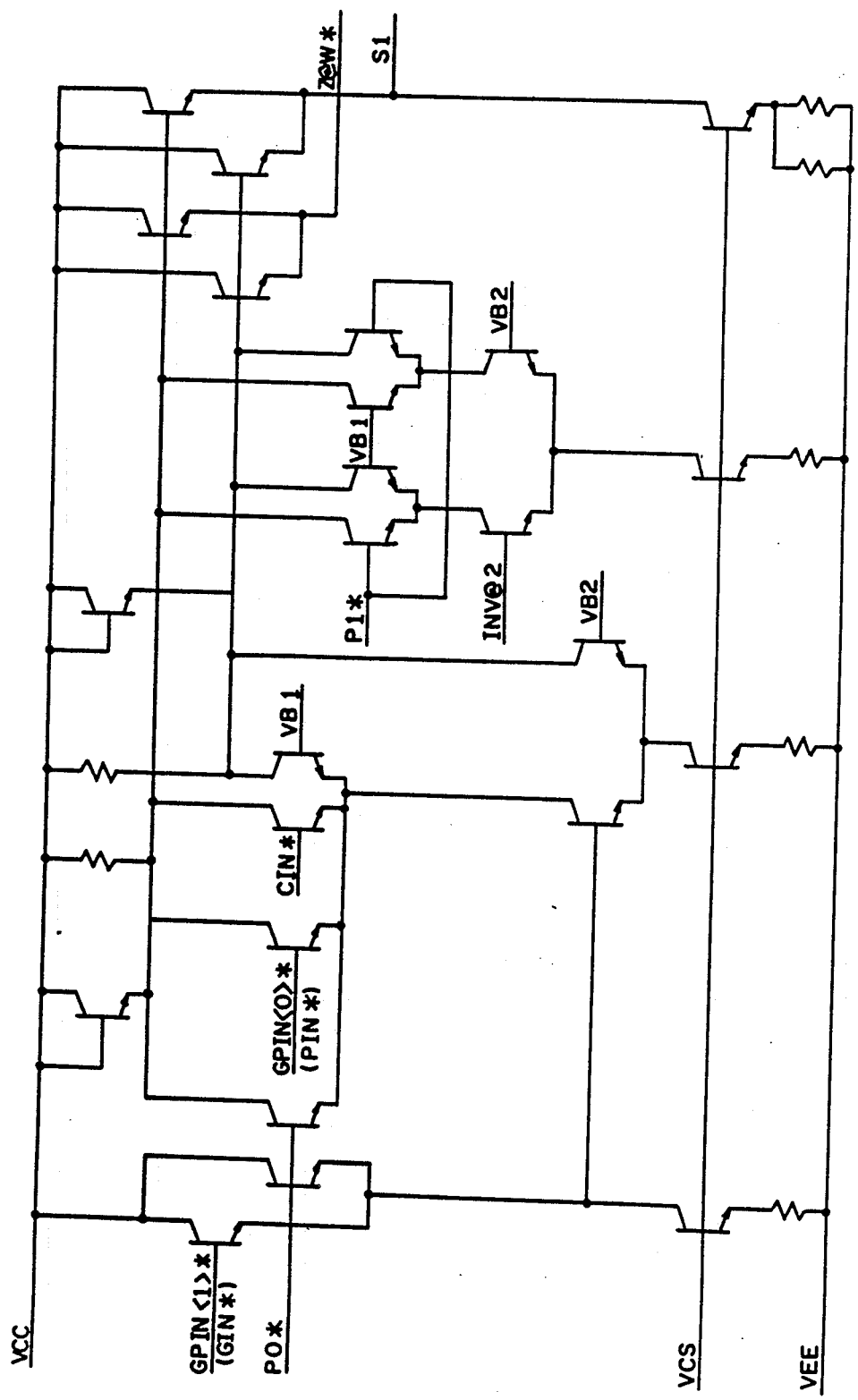
FIG. 22B is a transistor-level diagram of the MSB portion of the two-bit adder slice of FIG. 20.

FIG. 22B is a transistor level schematic diagram of the most significant bit portion of the logic block 296 of FIG. 20.

Referring now to FIGS. 22A and 22B, those skilled in the art may observe that the function of XORs 298 and 299 in FIG. 21B are implemented with virtually no additional transistors and, most important, no additional delay than would be incurred in their absence Thus, this implementation allows the logic represented in FIG. 19 to carry out floating point arithmetic with the following execution times:

| Operation | Execution time (nanoseconds) |
| --- | --- |
| Single-precision floating-point multiply | 40 |
| Double-precision floating-point multiply | 50 |
| 32-by-32 integer multiply | 45 |
| Single-precision floating-point divide | 200 |
| Double-precision floating-point divide | 300 |
| Single-precision floating-point square root | 300 |
| Double-precision floating-point square root | 600 |

Using the MPY AND FALU Integrated Circuits

Figure 24:
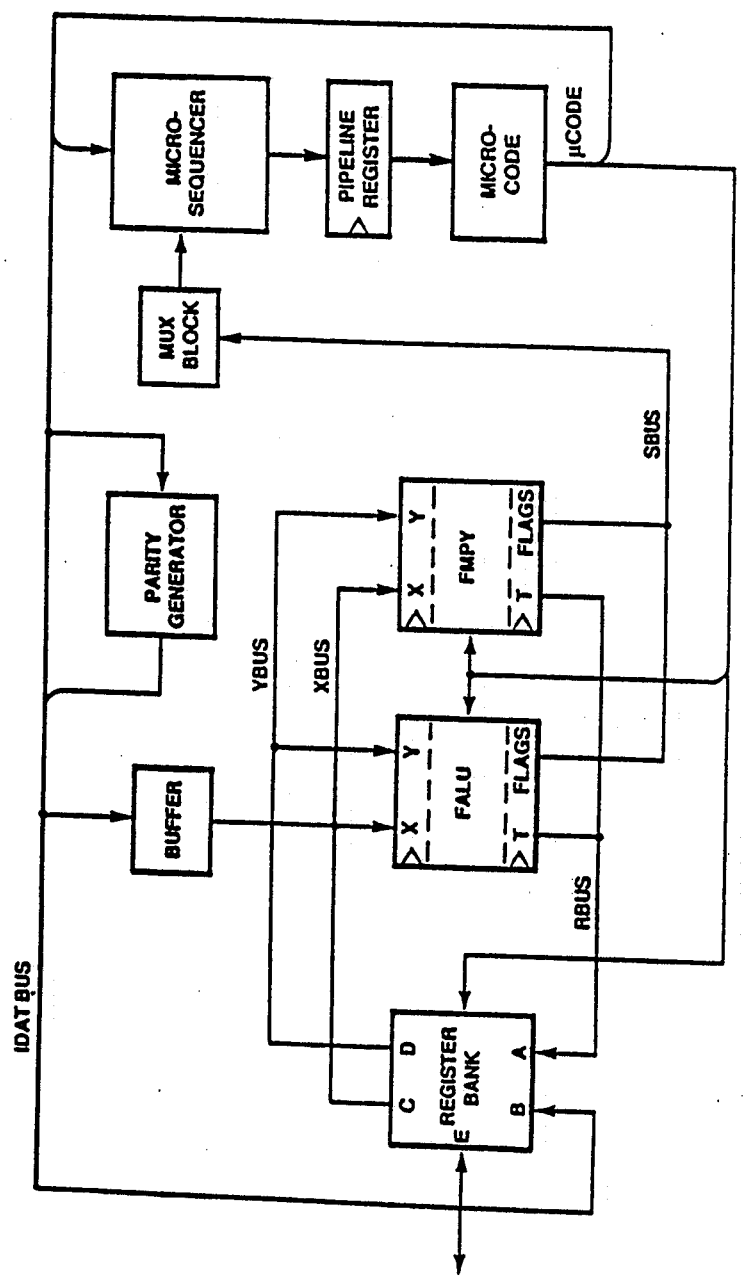
FIG. 24 is a functional block diagram of an example of a CPU including the FMPY and FALU integrated circuits of FIG. 1.

FIG. 24 is a register transfer level diagram of an example of a CPU using the FALU and FMPY integrated circuits. Details of one implementation of a CPU of this type are given published in "Designing a Micro-Sequenced CPU with the B3110/B3120" Application Note AN-1 (Bipolar Integrated Technology, Inc., August, 1987).

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A binary method of multiplying a multiplicand by a multiplier to form a product comprising the steps of:
   recoding the multiplier to form first and second ordered series of recode groups of bits, the first and second series being interleaved with respect to binary significance;
   operating on the multiplicand in accordance with each one of the first and second ordered series of recode groups to form first and second ordered series of partial product terms, respectively; and
   reducing the first and second series of partial product terms to form the product.

2. A method according to claim 1 wherein operating on the multiplicand includes:
   segmenting the multiplicand to form a series of multiplicand slices having equal bit lengths, and
   simultaneously operating on each of said multiplicand slices in accordance with selected one of the recode groups of bits to form a corresponding set of partial product terms.

3. A method according to claim 1 wherein:
   said recoding includes second-order modified Booth's algorithm recoding the multiplier to form a plurality of recode groups of bits, each recode group consisting of three bits in two's-complement binary format;
   said operating includes multiplying the multiplicand by the binary number represented by each recode group to form a partial product term corresponding to said recode group equal to one of $-2, -1, 0, 1$ and $2$ times the multiplicand.

4. A method according to claim 1 including:
   clocking in the multiplier and multiplicand at a first clock rate;
   clocking said reducing of the partial product terms at a second clock rate faster than the first clock rate; and
   upon clocking in each multiplier/multiplicand pair, stopping said clocking at the second clock rate for a predetermined time interval and then restarting the clocking at the second clock rate.

5. A method according to claim 1 including:
   forming a normalized and rounded up product;
   simultaneously forming a rounded up product;
   simultaneously forming a truncated product; and
   selecting one of the normalized and rounded up products, the rounded up product and the truncated product as a final result, thereby minimizing processing delay.

6. A method according to claim 1 in which reducing the partial product terms includes:
   providing first and second adders;
   sequentially adding the first series of partial product terms into the first adder in ascending order of binary significance so that the binary significance of sum data from the first adder increases with each clock cycle;
   sequentially adding the second series of partial product terms into the second adder in ascending order of binary significance so that the binary significance of sum data from the second adder increases with each clock cycle;
   clocking new sum data alternately from each of the adders;
   cross-coupling the adders so that a predetermined number of the most significant bits of the sum data from the first adder are input to the second adder and a predetermined number of the most significant bits of sum data from the second adder are input to the first adder;
   summing the remaining least significant bits of sum data from the first and second adders to form a segment of the product; and
   concatenating the segments of the product to form the product.

7. A method according to claim 6 wherein the first and second adders are latched adders and sequentially adding the first and second series of partial product terms includes:
   providing a two-phase clock, the first and second latched adders reciprocally responsive to the clock on opposite phases of the clock;
   providing an initial partial sum;
   on the even phase of the clock, adding in the first latched adder the first one of the first series of partial product terms to the initial partial sum to form a second partial sum;
   providing the second partial sum to the second latched adder;
   on the odd phase of the clock, adding in the second latched adder the first one of the second series of partial product terms to the second partial sum to form a third partial sum;
   providing the third partial sum back to the first latched adder for summing with a next subsequent one of the first series of partial product terms; and
   repeating said steps over subsequent clock cycles until all of the partial product terms have been sequentially added into the latched adders.

8. A method according to claim 1, wherein said step includes:
   adding the first one of the first series of partial product terms to an initial partial sum to form a second partial sum;
   shifting the second partial sum to form an adjusted second partial sum;
   adding the first one of the second series of partial product terms to the adjusted second partial sum to form a third partial sum;
   shifting the third partial sum to form an adjusted third partial sum;
   adding the second one of the first series of partial product terms to the adjusted third partial sum to form a fourth partial sum;
   shifting the fourth partial sum to form an adjusted fourth partial sum;
   adding the second one of the second series of partial product terms to the adjusted fourth partial sum to form a fifth partial sum; and
   repeating said shifting and adding steps, to sequentially add subsequent partial product terms to partial sums, alternately from each of the first and second series of partial product terms, to form subsequent partial sums until all of the partial product terms are exhausted, thereby forming the product.

9. A method according to 8 including:
providing a two-phase clock, a first adder and a second adder, the first and second adders reciprocally responsive to the clock on opposite phases of the clock;
cross-coupling the first and second adders to provide aligned sum data from each one of the adders as input data to the other one of the adders; and wherein:
each of the first series of partial product terms is sequentially added into the first adder; and
each of the second series of partial product terms is sequentially added into the second adder, whereby the first and second series of partial product terms are reduced concurrently in the adders.

10. A method according to 9 wherein:
the first and second adders include first and second arrays of carry-save adder cells, respectively, each cell having sum and carry outputs and having sum, carry and term inputs, and including:
coupling the sum and carry outputs from each cell of each of the arrays to sum and carry inputs of a corresponding cell in the other array;
providing the first and second series of partial product terms to the term inputs of the first and second arrays, respectively; and wherein
said shifting each of the partial sums includes offsetting said sum and carry outputs from said sum and carry inputs of the corresponding cell by a predetermined number of bit positions to align the partial sum for summing with a subsequent partial product term on a next subsequent phase of the clock.

11. A method according to claim 1 wherein said reducing step includes:
sequentially summing the first series of partial product terms to form first intermediate results;
concurrently with said summing step, sequentially summing the second series of partial product terms to form second intermediate results, the first and second intermediate results being interleaved with respect to binary significance;
combining the first and second intermediate results to form partial final results; and
sequentially concatenating the partial final results to form the product.

12. A method of multiplying a multiplicand by a multiplier to form a product comprising the steps of:
recording the multiplier to form an ordered series of recode groups of bits;
operating on the multiplicand in accordance with each one of the series of recode groups to form a series of partial product terms;
providing a two-phase clock, a first adder and a second adder, the first and second adders reciprocally responsive to the clock on opposite phases of the clock;
providing an initial partial sum;
on the even phase of the clock, adding in the first adder the first one of the series of partial product terms to the initial partial sum to form a second partial sum;
shifting the second partial sum to form an adjusted second partial sum;
providing the adjusted second partial sum to the second adder on the odd phase of the clock, adding in the second adder the second one of the series of partial product terms to the adjusted second partial sum to form a third partial sum;
shifting the third partial sum to form an adjusted third partial sum;
providing the adjusted third partial sum back to the first adder for summing with a subsequent one of the series of partial product terms;
repeating said steps over subsequent clock cycles until all of the series of partial product terms have been added into the first and second adders thereby forming first and second final partial sums in the first and second adders, respectively; and
summing the final partial sums to form the product of the multiplier and the multiplicand.

13. A method according to claim 12, each of the first adder and the second adder including an array of latched carry-save adder cells, wherein:
said shifting includes interleaving the carry-save adder cells such that the sum outputs of each of the first adder carry-save adder cells are provided to inputs of the corresponding carry-save adder cells in the second adder; and
said forming the product includes sequentially shifting the partial sums out of the carry-save adder cells out of the bottom cell of the array, summing the partial sums to form partial results and concatenating the partial results to form the product.

14. A method according to claim 12 including synchronizing said operating on the multiplicand with said adding steps, said synchronizing including:
on a first phase of the clock, producing the first one of the series of partial product terms for input to the first adder;
on a second phase of the clock, producing the second one of the series of partial product terms for input to the second adder;
on the first phase of the clock, adding in the second adder the second partial product term to the sum output of the first adder;
on the second phase of the clock, adding in the first adder the first partial product term to the sum output of the second adder; and
repeating said steps on subsequent clock cycles so that two partial product terms are added into the adders during each clock cycle.

15. A binary method of multiplying a multiplicand by a multiplier to form a product comprising the steps of:
recoding the multiplier to form a series of recode groups of bits;
segmenting the multiplicand to form a series of multiplicand slices;
operating on each multiplicand slice in accordance with each one of the series of recode groups of bits to form a corresponding series of partial product terms;
providing a two-phase clock, a first adder and a second adder, the first and second adders reciprocally responsive to the clock on opposite phases of the clock;
on the even phase of the clock, adding in the first adder a first one of the series of partial product terms to an initial partial sum to form a second partial sum;
shifting the second partial sum;
providing the shifted second partial sum to the second adder;

on the odd phase of the clock, adding in the second adder a second one of the series of partial product terms to the shifted second partial sum to form a third partial sum;

shifting the third partial sum;

providing the shifted third partial sum back to the first adder for summing with a subsequent one of the series of partial product terms;

repeating said steps over subsequent clock cycles until substantially one-half of the series of partial product terms have been added into the first and second adders;

providing third and fourth adders, responsive to said first and second phases of the clock respectively; and simultaneously with the operation of the first and second adders, reducing the others of the partial product terms in the third and fourth adders:

said operating of the multiplicand including operating on each multiplicand slice to form a partial product term;

providing a second initial partial sum;

substantially simultaneously with the operation of the first and second adders, reducing substantially one-half of the series of partial product terms in the third and fourth adders, by performing said adding, shifting, providing, adding, shifting, and providing and repeating said steps with respect said one-half of the series of partial product terms for reducing N partial products in N/4 clock cycles.

16. A binary method of multiplying a multiplicand by a multiplier to form a product comprising the steps of:

recoding the multiplier to form a series of recode groups of bits;

operating on the multiplicand in accordance with each one of the series of recode groups to produce a corresponding series of partial products;

iteratively reducing the series of partial products to form the product;

clocking the production of the series of partial products and iterative reduction thereof at a second clock rate faster than the first clock rate; and upon clocking in each multiplier/multiplicand pair, stopping the second clock for a predetermined time interval and then restarting the second clock.

17. A binary multiplier circuit for multiplying a multiplicand by a multiplier to form a product, comprising:

first input means for latching the multiplier;

second input means for latching the multiplicand;

partial product means connected to receive the multiplier and the multiplicand for calculating partial products;

a two-phase clock means for clocking said circuit;

a first adder including a first array of carry-save adder cells, each cell responsive to a first phase of the clock means;

and having a first input, a second input and a sum output;

the partial product means being connected to provide a first selected series of partial products to the first inputs to the first array;

a second adder including a second array of carry-save adder cells, each cell responsive to a second phase of the clock means, and having a first input, a second input and a sum output;

the partial product means being connected to provide a second selected series of partial products to the first inputs to the second array;

the first carry-save adder cell array and the second carry-save adder cell array being interleaved such that the sum outputs of each cell in the first cell array are provided to the second inputs of the cells in the second cell array and the sum outputs of each cell of the second cell array are provided to the second inputs of the first cell array so that responsive to each successive clock phase, data from the sum outputs of one cell array is added to a partial product in the other cell array alternately from one array to the other array to form partial results; and result register means connected to receive the partial results for accumulating the partial results to form the product.

18. A circuit according to claim 17 wherein each carry-save adder cell includes:

an 8-bit wide carry-save adder having A, B and C inputs and D and E outputs, all of said inputs and outputs consisting of 8 bits;

the first carry-save adder addend input is provided to the A input of the carry-save adder;

the second carry-save adder addend input is provided to the most significant 7 bits of the B input of the carry-save adder;

the carry-in bit is provided to the least significant bit position of the B input of the carry-save adder;

the third carry-save adder addend input is provided to the C input to the carry-save adder;

the least significant 7 bits of the D output are provided to form the carry output of the carry-save adder cell;

the most significant bit of the D output of the carry-save adder is provided to the carry-out bit of the carry-save adder cell; and the E output of the carry-save adder is provided to the sum output of the carry-save adder cell so that a carry-save adder array including N carry-save adder cells form an adder 8×N bits wide.

19. A circuit according to claim 18 wherein at least one of said arrays of carry-save adder cells is implemented in an integrated circuit such that three-level series gating is utilized so that each carry-save adder cell operates in one gate delay.

20. Binary multiplier logic comprising:

a first carry-cave adder cell array, each cell having first, second and third addend inputs, sum and carry outputs and a carry-bit output;

a second carry-save adder cell array, each cell having first, second and third addend inputs, sum and carry outputs and a carry-bit output;

the carry-save adder cells within each array interconnected in a chain defining succeeding and preceding cells such that the sum and carry outputs from each cell are provided to the first and second addend inputs of the next succeeding carry-save adder cell and the carry-bit output of each cell is input to the least significant bit position of one of the first and second addend inputs to the next preceding carry-save adder cell;

a first set of multipliers, each multiplier corresponding to a respective cell in the first carry-save adder cell array, and having a multiplicand input, a recode input and a term output, each of the multiplicand inputs connected to receive a predetermined segment of the multiplicand, each of the recode inputs connected to receive recoded bits of the multiplier, and each of the terms outputs connected to provide a partial product term to the third addend input of the corresponding carry-save adder cell in the first carry-save adder cell array; and a second set of multipliers, each multiplier corresponding to a respective cell in the second carry-save save adder cell array, and having a multiplicand input, a recode input and a term output, each of the multiplicand inputs connected to receive a predetermined segment of the multiplicand, each of the recode inputs connected to receive recoded bits of the multiplier, and each of the term outputs connected to provide a partial product term to the third addend input of the corresponding carry-save adder cell in the second carry-save adder cell array.

21. Binary multiplier logic according to claim 20 including two-phase clock means for controlling the first and second sets of multipliers on opposite phases of the clock means and for controlling the first and second carry-save adder cell arrays on opposite phases of the clock means, the first set of multipliers and the second adder array being responsive to the clock means on a first clock phase;

the second set of multipliers and the first adder array being responsive to the clock means on a second clock phase opposite to the first clock phase;

to sequentially form partial product terms and to reduce said partial product terms in the carry-save adder arrays to form partial sums.

22. A binary multiplier circuit according to claim 21 wherein the two-phase clock means is an internal clock circuit having a frequency greater than the system clock.

23. A binary multiplier circuit according to claim 22 wherein the internal clock is stopped responsive to the arrival of new operand data to synchronize the internal clock to the system clock.

24. A circuit according to claim 23, the internal clock including means for generating an abort signal responsive to the arrival of new operand data, wherein said partial product means is reset and said iterative reducing means is cleared responsive to the abort signal.

25. A binary multiplier circuit for multiplying a multiplicand by a multiplier to form a product, comprising:

partial product means coupled to receive the multiplier and the multiplicand for calculating first and second sequential series of partial product terms, the first and second series being interleaved with respect to binary significance;

a clock means for providing a two-phase clock signal;

a first adder responsive to a first phase of the clock signal and a second adder responsive to a second phase of the clock signal;

the first adder coupled to receive the first series of partial product terms and the second adder coupled to receive the second series of partial product terms;

the first adder and the second adder being interconnected such that sum data from the first adder are coupled to inputs to the second adder and sum data from the second adder are coupled to inputs to the first adder so that, responsive to each successive phase of the clock signal, data present at the sum outputs of one adder is added to a partial product term in the other adder, alternately from one adder to the other, to form partial results; and result register means connected to receive the partial results for concatenating the partial results to form the product.

26. A circuit according to claim 23 in which:

the first and second adders each has a first input, a second input and a sum output;

the partial product means is connected to provide the first series of partial product terms to the first input to the first adder;

the partial product means is connected to provide the second series of partial product terms to the first input to the second adder;

the sum output of the first adder is coupled to the second input to the second adder; and the sum output of the second adder is coupled to the second input to the first adder and coupled to the result register means.

27. A circuit according to claim 25 wherein the partial product means includes:

means for segmenting the multiplicand to form a plurality of multiplicand slices having equal bit lengths; and wherein the partial product means includes a first set of multipliers for multiplying each of the slices to form the first series of partial product terms and a second set of multipliers for multiplying each of the slices to form the second series of partial product terms; and said adders are adapted to reduce the first and second series of partial product terms in accordance with the significance of each term to form the partial results.

28. A binary multiplier circuit according to claim 22 wherein the internal clock circuit is selectably operable to provide one of a first frequency and a second, higher frequency for testing the device.

* * * * *

UNITED STATES PATENT AND TRADEMARK OFFICE
CERTIFICATE OF CORRECTION

PATENT NO. : 4,972,362

DATED : November 20, 1990

INVENTOR(S) : Elkind et al

It is certified that error appears in the above-identified patent and that said Letters Patent is hereby corrected as shown below:

On the title page, under item [56] References Cited, in the OTHER PUBLICATIONS, col. 2, line 4, change "EC1 Gains" to --ECL Gains--; line 10, change "EC1 Runs" to --ECL Runs--; and line 20, change "16 x 18 CMOS" to --16 x 16 CMOS--.

Column 3, line 9, change "on the output and" to --on the input and--; and line 10, change "on the input ports" to --on the output ports--.

Column 4, line 24, insert --of the invention will become more readily apparent from the--.

Column 9, line 45, change "MPR," to --$MPR_1$,--; and line 39, after "pair")" and before "one" insert --during--.

Column 16, line 17, after "except that" and before "WTB" insert --in the--.

Column 18, line 62, after "too" and before "summed" insert --are--.

Column 19, line 41, change "line inserted" to --line is asserted--.

Column 22, line 24, change "and @W" to --and Z@W--.

Column 23, line 28, change "with selected" to --with a selected--.

UNITED STATES PATENT AND TRADEMARK OFFICE
CERTIFICATE OF CORRECTION

PATENT NO.  :  4,972,362

DATED       :  November 20, 1990

INVENTOR(S) :  Elkind et al

It is certified that error appears in the above-identified patent and that said Letters Patent is hereby corrected as shown below:

Column 25, line 50, change "recording" to --recoding--.

Signed and Sealed this

Fourth Day of May, 1993

Attest:

MICHAEL K. KIRK

Attesting Officer

Acting Commissioner of Patents and Trademarks